(12) United States Patent
Shier et al.

(10) Patent No.: US 7,181,382 B2
(45) Date of Patent: Feb. 20, 2007

(54) SYSTEM AND METHOD FOR TESTING, SIMULATING, AND CONTROLLING COMPUTER SOFTWARE AND HARDWARE

(75) Inventors: Peter Shier, Seattle, WA (US); Vinod Mamtani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 10/435,481

(22) Filed: May 8, 2003

(65) Prior Publication Data

US 2005/0015702 A1  Jan. 20, 2005

(51) Int. Cl.
G06F 17/50 (2006.01)
G06F 15/00 (2006.01)
G06F 3/00 (2006.01)
G06F 9/44 (2006.01)
G06F 9/46 (2006.01)
G06F 13/00 (2006.01)
G06F 11/00 (2006.01)

(52) U.S. Cl. .......................... 703/13; 703/24; 719/315; 719/321; 719/325; 719/324; 702/182

(58) Field of Classification Search ................ 703/24, 703/13; 719/315, 321, 328, 324, 325; 702/182
See application file for complete search history.

(56) References Cited

U.S. PATENT DOCUMENTS 5,926,775 A * 7/1999 Brumley et al. ............. 702/127
6,182,242 B1 * 1/2001 Brogan et al. ................ 714/26

OTHER PUBLICATIONS

NuMega, "Using DriverWorks" Apr. 1999, 177 pages.*

* cited by examiner

Primary Examiner—Paul Rodriguez
Assistant Examiner—Dwin McTaggart Craig
(74) Attorney, Agent, or Firm—Christensen O'Connor Johnson Kindness PLLC

(57) ABSTRACT

A system and method for providing an extensibility model to create device simulators. The system and method provide a generalized framework for the simulation of hardware devices controlled by software drivers with user and kernel mode programmability. The present invention also provides a framework that facilitates communication between applications operating user address space of an operating system and device drivers and device simulators operating in kernel mode address space of the operating system. In one embodiment, a framework provides a bi-directional communication channel that allows a test application in user address space of an operating system to communicate with a computer component operating in kernel address space of the operating system.

25 Claims, 11 Drawing Sheets

SYSTEM AND METHOD FOR TESTING, SIMULATING, AND CONTROLLING COMPUTER SOFTWARE AND HARDWARE

FIELD OF THE INVENTION

The present invention relates to computer hardware and software and, more particularly, to systems and methods for testing, simulating, and controlling hardware devices and software components.

BACKGROUND OF THE INVENTION

In recent years, there has been a tremendous growth in the use of computer products, i.e., products that contain a data processor, such as desktop and laptop computers, personal data assistants (PDAs), computerized mobile phones, and the like. The increased use of computer products has placed additional production demands on existing manufacturing and testing capabilities. The increased production demands, along with a longstanding interest to continually improve the quality of manufactured computer products, have intensified a continuing need to improve the efficiency of test procedures. As described below, the need for improved efficiency is especially acute for quality test procedures involving computer hardware devices, such as a keyboard, mouse, printer, modem, scanner, etc., and drivers for such devices.

Computing environments for testing hardware devices, hardware drivers, and software applications that communicate with hardware drivers introduce many drawbacks because hardware devices and device drivers must be physically connected to and/or installed in a computer product prior to the execution of the test procedures. Thus, conventional test methods include an inefficient, time-intensive step that requires a person to physically install or connect a hardware device and manually load one or more software drivers for the hardware device. Among many other disadvantages, testing methods involving the manual installation of software and hardware components often encounter problems caused by human error. Such test environments are further hampered by the cumbersome task of coordinating test procedures between many human testers assigned to simultaneously test large quantities of computer products at one time.

The aforementioned drawbacks are exacerbated by the fact that conventional test environments require a tester to manage large inventories of hardware devices. During the development of many software products, such as an operating system, it is desirable to test the software products with a range of hardware devices. Given the voluminous number of makes and models of each type of hardware device, testing tasks are further burdened by the fact that existing test methods require that a human tester manage the logistics of acquiring each hardware device and then perform tests on each make and model. Existing test procedures are further burdened by the fact that the tester is required to maintain complex logs of test results. These manual tasks introduce many additional problems caused by human error.

One way to improve the efficiency of test procedures is to automate test procedures to the extent possible. For example, some existing testing systems utilize a hard-coded device simulator, which enables a tester to simulate the functions of a hardware device without having to physically install a hardware device in a computer. Although some existing automation tools, such as a hard-coded device simulator, improve certain aspects of software test procedures, such automation tools present other drawbacks. One drawback of existing device simulators stems from the fact that they are hard-coded, requiring each device simulator to be redesigned and rebuilt each time the functional characteristics of the tested device are modified. Because of this drawback in most computing environments, hard-coded device simulators do not offer a flexible and cost-efficient hardware device testing solution.

In addition to hard-coded device simulators, other existing testing tools involve the use of scripts to automate certain aspects of computer product test procedures. Although scripts are useful in testing certain user-level applications, test scripts cannot be readily configured to communicate with hardware drivers because they cannot directly communicate with software components located in the kernel address space of an operating system. Thus, the prior art test automation scripts and programs normally used for applications that operate in a user address space of an operating system cannot be readily applied to tests involving hardware devices and device drivers.

As will be readily understood from the foregoing, a need exists for computerized test systems and methods that improve the testing of hardware devices, device drivers, and software applications that communicate with device drivers. More specifically, there is a need for automated systems and methods that provide a framework that utilizes a device simulator having a simplified structure. A need also exists for a system and method that allow user mode applications, such as computer test applications, to readily communicate with device drivers and driver simulators.

SUMMARY OF THE INVENTION

Generally described, the present invention is directed to a system and method that improve the testing of hardware devices, device drivers, and software applications that communicate with device drivers. In accordance with one aspect of the present invention, the system and method provide a communication channel that allows an application operating in user address space of an operating system to communicate with a device driver or a device simulator driver operating in kernel address space of the operating system. A device simulator driver is software that can be configured to simulate either a device driver for a hardware device or both the device driver and the hardware device. The communication channel allows a software application, such as a test application, to instruct a device driver or device simulator driver to execute one or more functions. In an example of a test procedure involving a keyboard and a keyboard driver, a test application may be configured with a command to instruct the keyboard driver to receive a command to actuate a key, without the keyboard driver being connected to the keyboard or, if connected, without a tester manually activating the key. The keyboard driver would then function as if an actual key on the keyboard was actuated. This aspect of the present invention enables extensive automation of device and device driver testing, i.e., without tester intervention.

The communication channel, which can be a bidirectional data path, also allows a device driver or a device simulator driver operating in a kernel address space to send data or software objects to an application, such as a test application, that is operating in user address space. Among many other benefits, the establishment of a bidirectional data path allows the device driver or the device simulator driver to send data to user mode applications for enhancing the functionality of an automated test system.

In one exemplary embodiment, a method for testing a computer component is provided. The computer component can be a device driver or a device simulator driver. Generally described, a test application executing in the user address space of an operating system communicates an instruction to a computer component executing in the kernel address space of the operating system, requesting the performance of a function of the computer component. The method includes creating a component object in the kernel address space, the kernel object comprising at least one interface for communicating data to the computer component. A proxy object is created in the user address space. The proxy object is configured to represent the component object by the use of an operating system identifier that is related to both the proxy object and the component object.

After the objects are created, a communication channel is established between the proxy object in the user address space and the component object in the kernel address space. The communication channel can be formed by any suitable communication interface, such as an IOCTL programming interface, for example. When communicating the instruction from the test application to the computer component, for example, the proxy object receives an instruction from the test application and combines the instruction in a data packet. The data packet is then communicated to the component object using the communication channel. When the data packet is received by the component object, the data packet is decoded to obtain the instruction that was generated by the test application. The component object then executes the functions of the instruction.

In another embodiment, the present invention provides a method for establishing a communication channel between a kernel object, i.e., an object that operates in the kernel address space of an operating system, and a user object, i.e., an object that operates in the user address space of the operating system. More specifically, the method includes the creation of the kernel object in the kernel address space of the operating system and the execution of a proxy object in the user address space of the operating system. The proxy object is configured to represent the kernel object by relating both objects to an operating system identifier. The method also includes establishing a communication channel between the proxy object and the kernel object by the use of a communication interface, such as an IOCTL programming interface, for example. After the communication channel is established between the two objects, software applications operating in the user address space have access to the kernel object.

In accordance with another aspect of the present invention, the system and method provide a framework of software components for redirecting hardware interaction. In addition, the system and method provide a number of services for enhancing test procedures. In one embodiment, the framework includes a dynamically loadable software module that is configured to intercept data that is communicated between a hardware device and a device driver. The intercepted data is redirected to a device simulator driver. The redirection function provided by the framework and the software module allows a device simulator driver having simplified simulator driver code to be used for software and hardware infrastructure testing. As an alternative function, the dynamically loadable software module can communicate the intercepted data to a memory unit for storage. The stored data can be used for additional analysis and testing of the device driver or other components of the system. The above-described embodiments allow new hardware devices to be simulated before a prototype of the device is manufactured.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

For purposes of illustrating the present invention, a detailed description of a number of software implemented methods is provided. In addition to providing a detailed description of the functionality of each method, the following description also refers to a class name and a method name of defined software method specifications, which are further defined in the appendices of this application. The following description also refers to specific software-coded methods that are known in the art and publicly available at a number of programming resources—for example, the Microsoft® Developer Network database which is well known to those skilled in the art. Although the following description of an exemplary embodiment of the invention refers to Windows® specific implementations, the invention should not be construed as limited to the Windows® operating system. The description includes details sufficient for one of ordinary skill in the art to be able to implement the invention on other operating systems, such as UNIX.

The following description of the present invention first provides an overview of a computer suitable for implementing the system and method of the present invention. Following that, the description provides a brief overview of the software components used to make one embodiment of the present invention. Following this description, various methods for providing communication between user mode and kernel mode objects are described. User mode objects are objects that execute in the user address space of an operating system and kernel mode objects are objects that execute in the kernel mode address space of the operating system. As discussed more fully below, kernel address space is privileged space that is normally not accessible by objects executing in user address space. Next, a system and method for simulating a hardware device are described with reference to related drawings. The following description and its references to sample code implementations in the appendices provide a working example of the present invention.

Figure 1:
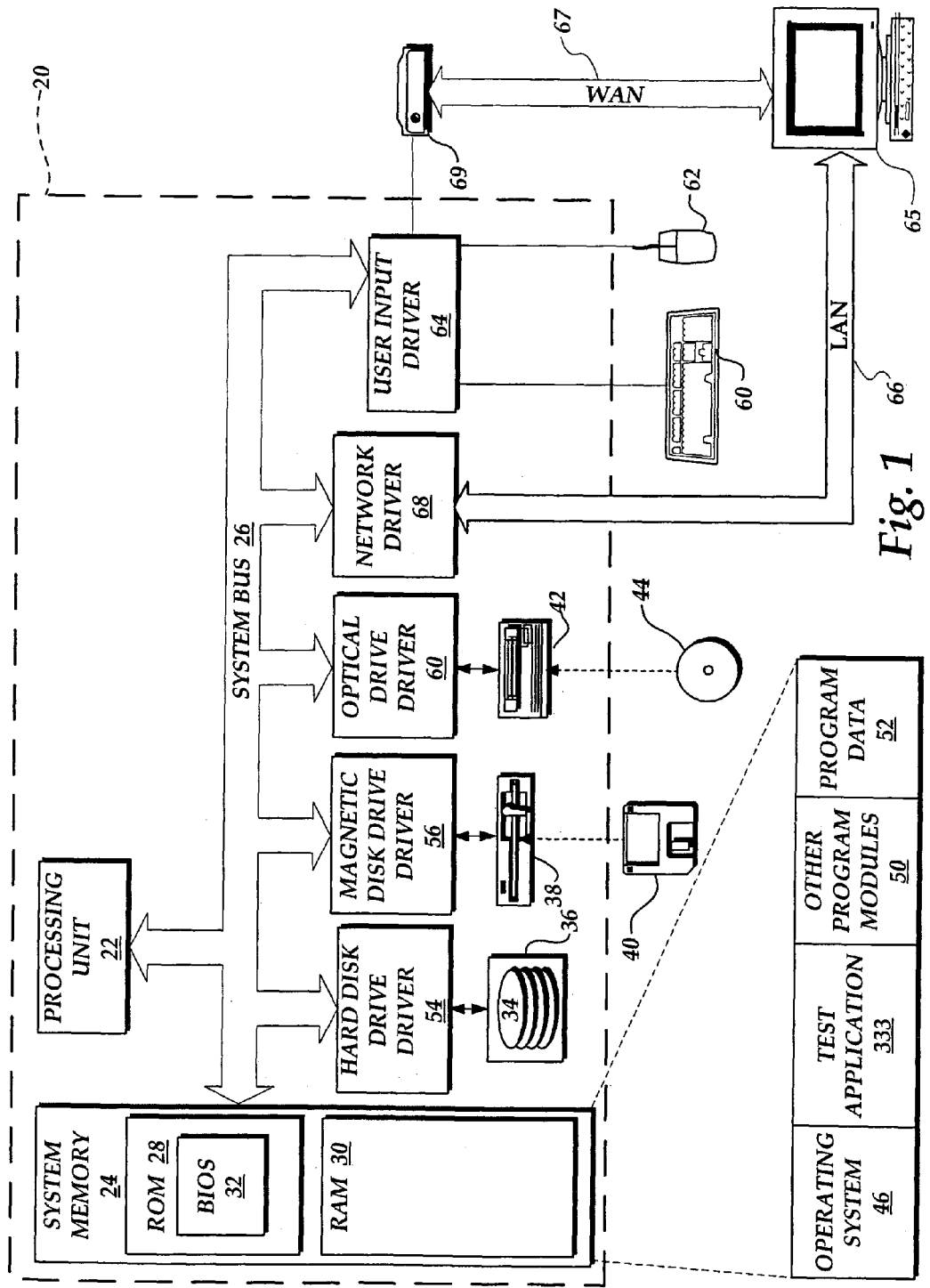
FIG. 1 is a block diagram of an exemplary computing environment suitable for implementing the system and method of the present invention.

FIG. 1 illustrates an exemplary computer system in which the invention may find use. The computer system includes a general purpose-computing device in the form of a computer 20. Components of the computer 20 include, but are not limited to, a processing unit 22, system memory 24, and a system bus 26 that couples various system components including the system memory to the processing unit. The system bus 26 may be any of several types of bus structures, including a memory bus or memory controller, a peripheral bus, and a local bus using any of a variety of bus architectures. By way of example, not limitation, such architectures include an Industry Standard Architecture (ISA) normal capitalization bus, a Micro Channel Architecture (MCA) bus, an Enhanced ISA (EISA) bus, a Video Electronics Standards Association (VESA) local bus, and a Peripheral Component Interconnect (PCI) bus, also known as a Mezzanine bus.

The computer 20 typically includes a variety of computer-readable media. Computer-readable media can be any available media that can be accessed by the computer 20, and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium that can be used to store the desired information and that can be accessed by the computer 20.

The communication media typically embodies computer-readable instructions, data structures, program modules or other data that is in the form of a modulated data signal, e.g., a data signal carried by a carrier wave or other transport mechanism, and includes any information delivery media. In general, the term "modulated data signal" means a signal that has one or more of its characteristics set or changed so as to add information to the signal. By way of example, and not limitation, communication media includes wired media such as a wired network or direct wired connection, and wireless media such as acoustic, RF, infrared, and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 1 illustrates an operating system 47, a test application 333, other program modules 50, and program data 52.

The computer 20 may also include removable/non-removable, volatile/non-volatile computer storage media. By way of example only, FIG. 1 illustrates a hard disk drive 36 that reads from or writes to non-removable, non-volatile magnetic media 34, a magnetic drive 38 that reads from or writes to a removable, non-volatile magnetic disk 40, and an optical disk drive 42 that reads from or writes to a removable, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, solid state RAM, solid state ROM, and the like. The hard disk drive 36, magnetic disk drive 38, and optical disk drive 42 may be connected to the system bus 26 by a hard disk drive driver 54, a magnetic disk drive driver 56, and an optical drive driver 60, respectively.

When the computer 20 is turned on or reset, the BIOS 32, which is stored in ROM 28, instructs the processing unit 22 to load the operating system 46 from the hard disk drive 36 into the RAM 30. Once the operating system 46 is loaded into RAM 30, the processing unit 22 executes the operating system code and causes the visual elements associated with a user interface of the operating system to be displayed to a user. During operation of the computer 20, the user can use the test application 333 to test or control the hardware devices.

A user may enter commands and information into the computer 20 through input devices such as a keyboard 60 and a pointing device 62, commonly referred to as a mouse, track ball, or touch pad. Other devices that may be used with the computer 20 include controller cards, bus cards, external disk drives, network devices, game pads, scanners, or the like. These and other devices are often connected to the processing unit 22 through a user input driver 64, and may be connected by other interface devices and bus structures, such as a parallel port, game port, or other universal serial bus (USB).

The computer 20 may operate in a network environment using logical connections to one or more remote computers 65. The remote computer 65 may be a personal computer, a server, a router, a network PC, a peer device, or other common network node, and typically includes many or all of the elements described above relative to the computer 20, although only a memory storage device has been illustrated in FIG. 1. The logical connections depicted in FIG. 1 include a local area network (LAN) 66, a wide area network (WAN) 67, and possibly other networks. Such network environments are common in most computer networks, Intranets, and the Internet.

Although many other internal components of the computer 20 are not shown, those of ordinary skill will appreciate that such components and their interconnection are well known. Accordingly, additional details concerning the internal construction of the computer 20 need not be disclosed in connection with the present invention. As can be appreciated by one of ordinary skill in the art, the invention may be also practiced in distributed computing environments where the methods described herein are executed by remote processing devices that are linked through a network. In such a distributed computing environment, the program modules and other software components described below may be located in both the computer 20 and other remote computers 65.

As can be appreciated by one of ordinary skill in the art, the operating system 46 of the computer 20 may have a number of modes in which software applications and other program modules may execute. For instance, current versions of Alpha and Windows® operating systems comprise two modes in which software applications can execute—a user mode and a kernel mode. Software applications that operate in kernel mode, also referred to herein as "kernel mode applications," have access to and operate in a more privileged area of the computer memory, which is referred to herein as the kernel address space. On the other hand, software applications operating in user mode, also referred to herein as "user mode applications," have access to and operate in a less privileged area of the computer memory, which is referred to herein as the user address space. This division of operating modes prevents various types of communication between user mode applications and kernel mode applications.

As described above, the computer 20 is one suitable computing environment for implementing the system and method of the present invention. In accordance with one aspect of the present invention, the computer 20 may be used to execute one or more software modules that provide a communication channel for allowing a software application operating in a user address space of the operating system 46 to communicate with a software application operating in a kernel address space of the operating system 46.

Figure 2:
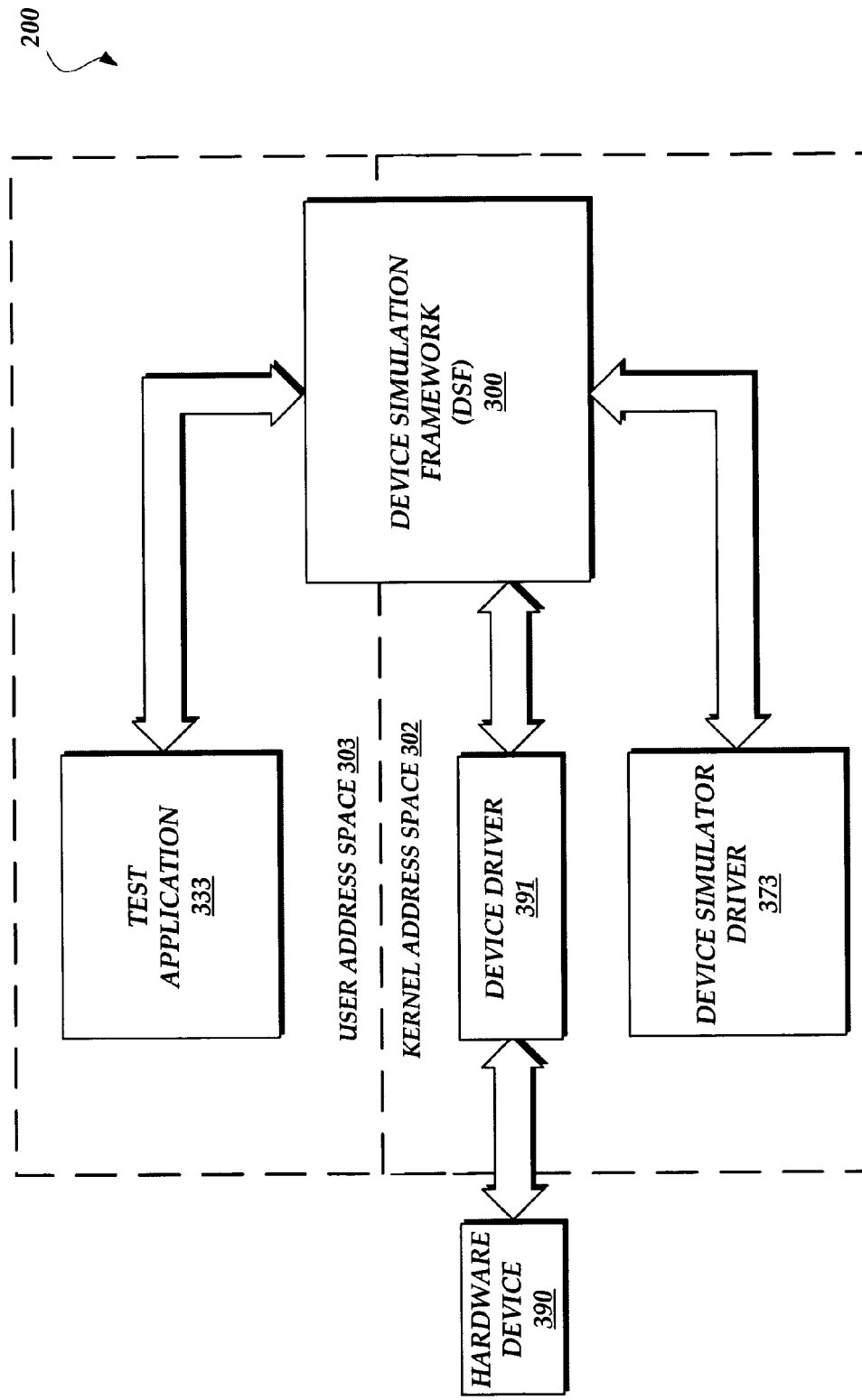
FIG. 2 is a schematic block diagram of an exemplary embodiment of a system for providing communication between a test application and a device simulator driver, according to the present invention.

FIG. 2 is an overview block diagram illustrating an exemplary embodiment of a system 200 for providing a communication channel that allows a software application operating in the user address space 303 of an operating system to communicate with a software application, i.e., a device driver operating in the kernel address space 302 of the operating system. In this specific embodiment, a device simulation framework (DSF) 300, which is also referred to herein as the "framework 300," is configured with a number of software components that operate in the user address space 303 and the kernel address space 302. The framework 300 is configured to communicate with a software application, such as a test application 333, operating in the user address space 303 of the operating system. The framework 300 is also configured to communicate with a software component, such as a device simulator driver 373, which is configured to simulate the functions of a hardware device. In addition, the framework 300 may be configured to communicate with a device driver 391, which is communicatively connected to a hardware device 390, i.e., a keyboard, hard drive, etc.

In one specific embodiment, the framework 300 allows the test application 333 to communicate with the device driver 391, allowing the test application 333 to control various functions of the device driver 391 and the hardware device 390. This arrangement allows the test application 333 to perform automated test procedures on the device driver 391 and, in some circumstances, the hardware device 390. For instance, the test application 333 may be configured with a command to instruct the device driver 391 to read data from or write data to the hardware device 390. Although this specific embodiment illustrates one example where the framework 300 allows a test application to communicate with a device driver, the framework 300 also allows other types of user mode application to communicate with device drivers or other kernel mode objects.

The framework 300 also allows the test application 333 to communicate with the device simulator driver 373. This arrangement allows the test application 333 to perform automated test procedures on the device simulator driver 373. For instance, the test application 333 may be configured with a command to instruct the device simulator driver 373 to execute one of its functions. For instance, in an example where the device simulator driver 373 is configured to simulate the functions of a keyboard, the test application 333 may instruct the device simulator driver 373 to perform a function, such as the actuation of the "caps lock" key, without the need of an actual keyboard, or, if connected, without a tester manually actuating the key. This aspect of the present invention enables extensive automation of device and device driver testing, i.e., without tester intervention.

Figure 3A:
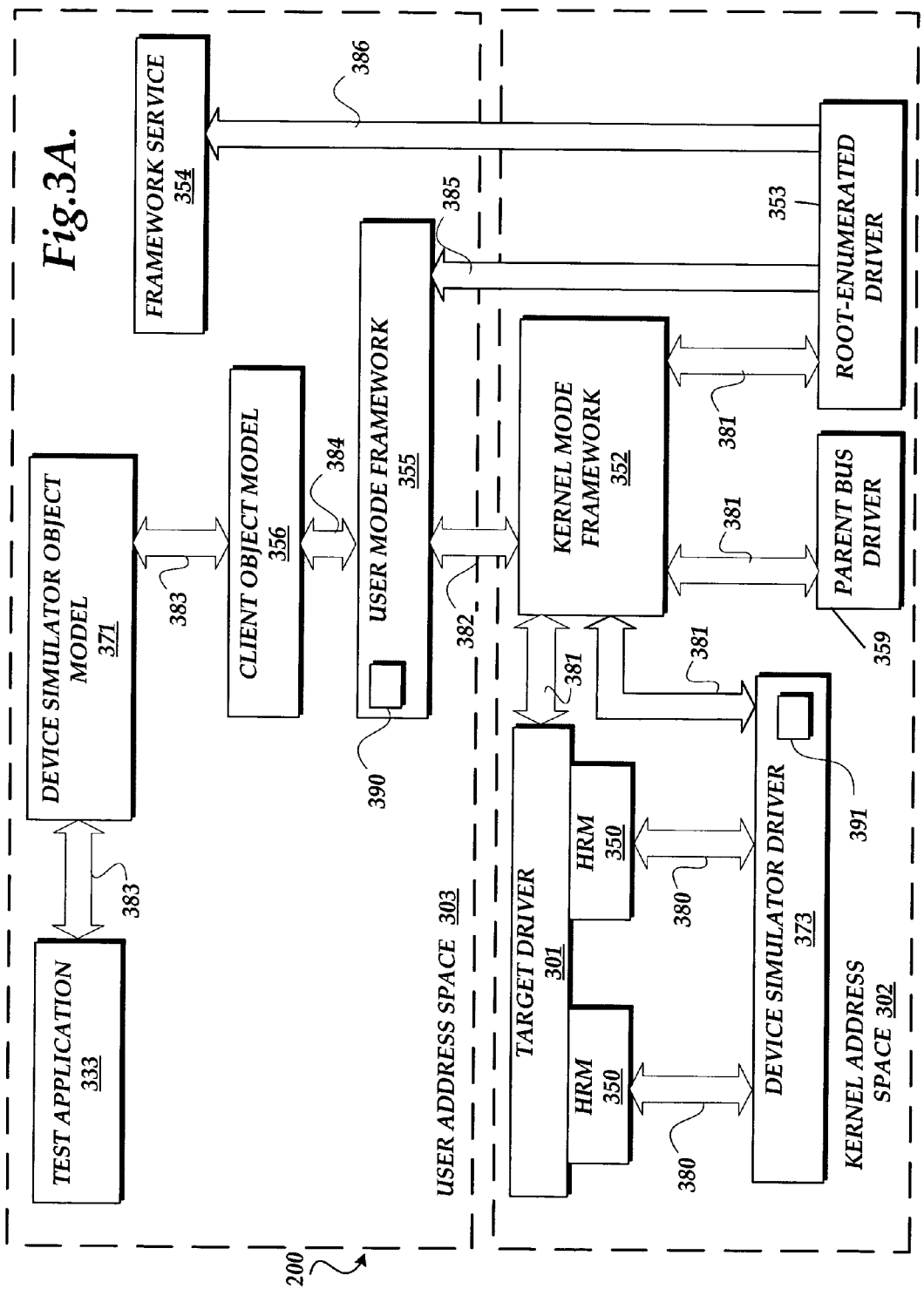
FIG. 3A is a functional block diagram of exemplary software components of a system for providing redirection of hardware interaction and communication between user and kernel mode objects formed in accordance with the present invention.

FIG. 3A is a block diagram of an exemplary embodiment of the system 200 shown in FIG. 2. More specifically, FIG. 3A illustrates the software components that make up the framework 300 and how each component relates to one another. In this embodiment, the framework 300 includes a kernel mode framework 352, a root-enumerated driver 353, and one or more hardware access redirection modules (HRMs) 350—all of which are configured to operate in the kernel address space 302 of an operating system. The framework 300 also includes a user mode framework 355, a framework service 354, and a client object model 356; all of which are configured to operate in the user address space 303 of the operating system. In addition, the system 200 also includes the test application 333 and a device simulator object model 371; both of which are configured to operate in the user address space 303. As described in more detail below, the test application 333 and the device simulator object model 371 utilize the framework 300 to send commands to the device simulator driver 373 to facilitate the testing of simulated devices, the automating of test procedures, or the performing of other functions that involve device driver communications.

The test application 333 is a software application that, as shown in FIGS. 2 and 3A and described above, is configured to operate in the user address space of an operating system 303. The test application 333 generates a number of commands that instruct a computer component, such as the device simulator driver 373, to perform one or more functions, and then monitors the execution of those functions. As will be appreciated by those of ordinary skill in the art, the test application 333 can be configured to generate a wide variety of commands designed to create a wide variety of automated test scenarios when the commands are executed. As described below, the framework 300 allows the test application 333 to communicate commands to both user mode and kernel mode software applications.

The device driver 391 is formed from a generally available driver that is configured to communicate with and control the hardware device 390. For instance, if the hardware device 390 is a mouse pointer, the device driver 391 may be made from any commercially available device driver that is compatible with a selected device.

The device simulator driver 373 is configurable to simulate the functions of a hardware device. More specifically, the device simulator driver 373 is configurable to (1) utilize the framework 300 to facilitate communication with test or other user mode applications, and (2) simulate the functions of a hardware device. For example, the device simulator driver 373 may be configured to simulate a hardware device, such as a keyboard. The device simulator driver 373 is also in communication with a device driver, such as the device driver 391 illustrated in FIG. 2. The device simulator driver 373 utilizes a device object 391 for carrying out the methods and functions of simulating a hardware device. For ease of description purposes, the device simulator driver 373 is sometimes herein called a computer component.

The device simulator driver 373 may be implemented using C++ programming. Preferably, such an implementation will include a class library that employs a simplified structure of programming code for defining the functions of a simulated device. More specifically, the device simulator driver 373 of such an implementation will be configured to simulate the functions of a device by the use of code that only defines the general functions of the simulated device, e.g., the generation of signals indicative of a keystroke. The computer code used to define several functions of the simulated device does not need to manage all of the data interactions or software object interfaces that are generally required in the construction of a stand-alone device simulator. Among many other benefits, a class library implementation provides functions that allow the device simulator driver 373 to implement only required interfaces defined by the framework 300. A class library implementation also provides portability of the simulator driver code, thereby allowing the code to execute in other environments. In addition, as described in the examples below, a class library implementation allows the device simulator driver code to be tested in user mode.

Appendix F is one example of a suitable class library. As outlined in Appendix F, all classes in the class library are derived from a single base class called "CDSFObject." The CDSF base class provides the generic COM (component object model) functionality that allows software components operating in user mode and kernel mode to communicate. The exemplary class library also provides software structures that allow a programmer to build on functions that control hardware access redirection and other operating system-related tasks, such as resource management.

To simulate a specific device, such as a keyboard, the code used to implement the device simulator driver preferably derives its own classes from one or more base classes of the class library, such as those referred to in the appendices as CDSFDriver and CDSFDevice, and overrides any virtual functions needed to implement its own functionality. Appendix B contains one working example of computer code that defines a device simulator driver. In the example shown in Appendix B, the code is formed to simulate the functions of a PS/2 keyboard. Generally described, this code enables the device simulator driver 373 to expose an object model that comprises a single software object with a method that simulates a key press action. The first file, TestSoftKbd.vbs, shows how the test application 333 would use the device simulator driver 373 to simulate a keyboard. The subsequent files of Appendix B show the implementation of the keyboard simulator and its general functions.

Returning to FIG. 3A, the function and structure of the kernel mode framework 352 is now described. Generally described, the kernel mode framework 352 implements all of the kernel mode logic of the framework 300. In addition to other functions, the kernel mode framework 352 creates and manages one or more communication channels 382 between the kernel mode framework 352 and the user mode framework 355. For example, the kernel mode framework 352 may create a communication channel 382 with the user mode framework 355 upon receipt of a request from the device simulator driver 373 to communicate data to the test application 333. In addition, the kernel mode framework 352 is configured to manage and store Guaranteed Unique Identifiers (GUIDs) that are utilized to identify kernel mode software objects. More specifically, the management and storage of the GUIDs allow programs operating in user address space to readily access software objects operating in kernel address space. To facilitate device simulation, the kernel mode framework 352 also manages other tasks associated with communication with other framework components. For instance, the kernel mode framework 352 creates a filter device object that represents a simulated hardware device. In addition, the kernel mode framework 352 stores data that describes the current set of simulated devices on the system.

The kernel mode framework 352 communicates with the device simulator driver 373, preferably using a port/miniport-style relationship, which will be appreciated by those of ordinary skill in the art as a communication device that implements Windows® Driver Model (WDM) code on behalf of the device simulator driver 373. The kernel mode framework 352 communicates with the user mode framework 355 via communication channel 382. The communication channel 382 can be established by the use of any one of a number of well known software communication mechanisms, such as an IOCTL interface, an application programming interface for reading and writing file data streams, or another communication mechanism such as one implemented by Windows® Management Instrumentation (WMI). For illustrative purposes, the code for implementing the functions of the kernel mode framework 352 is embodied in a software component referred to herein as DSFKSVCS.SYS.

The user mode framework 355 implements the user mode logic of the framework 300. In addition to other functions, the user mode framework 355 manages communication with the kernel mode framework 352 through the communication channel 382. The user mode framework 355 receives commands from the kernel mode framework 352 to create proxy objects 390 suitable for operating in the user address space 303. For example, the user mode framework 355 may be instructed to create a proxy object 390 that represents a device object 391. During operation, the user mode framework 355 also receives data, namely a GUID, from the kernel mode framework 352. Once communicated, the GUID is used to identify the device object 391 for user mode applications using it.

The user mode framework 355 and the kernel mode framework 352 are configured to allow proxy objects 390 to communicate with corresponding device objects 391 via the communication channel 382. As described in more detail below with respect to FIG. 4, the use of the communication channel 382 in conjunction with the proxy and device objects 390 and 391 allows a test application 333, which operates in user address space, to communicate a device simulator driver 373, which operates in kernel address space. For illustrative purposes, the code for implementing the functions of the user mode framework 355 is embodied in a software component referred to herein as DSFUSVCS.DLL.

The system may also include a target driver 301. The target driver 301 is a standard device driver for a hardware device, such as a device driver for a PS/2 keyboard. The target driver 301 may be loaded, for instance, when a test is to be performed on an actual device driver. Although the target driver of the herein described embodiment is a simple target driver, namely a keyboard driver, it is to be understood that the target driver 301 may comprise more complex drivers involving a port or port/miniport combination, such as those known in the art as USBPORT.SYS and USBEHCI.SYS.

The hardware access redirection modules (HRMs) 350 are dynamically loadable software components that are configured to intercept and control data communicated with the target driver 301. For instance, the device simulator driver 373 may request that an HRM 350 simulate the appearance of a hardware interrupt to the target driver 301. Each HRM 350 may also be configured to store the intercepted data in a computer storage device. The capturing, i.e., intercepting and storing of data, may be optionally enabled in each HRM 350 to provide a source of stored test results that can be used for subsequent analysis and testing of the system 200. In such embodiments, when the target driver 301 accesses a hardware device, the HRM 350 intercepts the call and logs the data of the call. If an actual hardware device is present, the HRM 350 may also forward the intercepted data to the actual hardware device. If an actual hardware device is not present, i.e., a test scenario where a device is simulated, the HRM 350 only forwards the intercepted data to the device simulator driver 373.

In one embodiment, an individual HRM 350 is loaded to handle each type of resource associated with a device. For instance, one HRM is loaded to handle interrupts, another HRM is loaded to handle direct memory access (DMA) calls, and another HRM is loaded to handle I/O port calls. Other HRM implementations can be configured to handle many other resources, such as, registers, shared memory, ACPI operational regions, General Purpose Events (GPE's), etc.

An HRM 350 that is configured to intercept and redirect interrupts (referred to herein as an Interrupt HRM) is linked to the target driver 301 to intercept interrupt calls, such as IoConnectInterrupt calls, from multiple sources. Such an HRM embodiment communicates with the framework 300 by exporting a source interface. One example of a suitable source interface is referred to herein as an IHRMInterrupts interface. Specific implementation details of an IHRMInterrupts interface are described in detail in Appendix C. Appendix C also describes specific methods for enabling an HRM to simulate a hardware interrupt on a device, a method referred to as IHRMInterrupts::FireInterrupt.

The Interrupt HRM is also configured to control the IRQ priority levels of an operating system to ensure efficient operation. For example, when the device simulator driver 373 calls IHRMInterrupts::FireInterrupt to fire a specified interrupt, the Interrupt HRM 350 will raise the IRQL as needed and call multiple interrupt service routines (ISRs) until one ISR acknowledges the interrupt. In this event, the ISRs that have not received an interrupt will read their status bits as supplied by a corresponding device simulator driver and ignore the interrupt. This is operatively equivalent to the mechanism used by hardware interrupts.

An HRM 350 that is configured to intercept and redirect port and register access calls (referenced to herein as a Port HRM) is linked to the target driver 301 to resolve the target driver's import of kernel API functions, such as READ_PORT_ULONG and READ_REGISTER_ULONG. Such an HRM embodiment communicates with the framework 300 by exporting a source interface that is used to inform the device simulator driver 373 when the target driver 301 accesses ports and registers on the simulated device. One example of a suitable source interface is referred to herein as an IHRMPortsEvents interface. Specific implementation details of an IHRMPortsEvents interface are described in detail in Appendix D. Appendix D also describes specific methods that are used when the target driver 301 reads from a register or port.

An HRM 350 that is configured to intercept and redirect DMA calls (referred to herein as a DMA HRM) is linked to the target driver 301 to resolve the target driver's import of kernel API functions, such as IoGetDmaAdapter. Such an HRM embodiment communicates with the framework 300 by exporting a source interface that allows the device simulator driver 373 to monitor DMA (direct memory access) and shared memory access. One example of a suitable source interface is referred to herein as an IHRMDma interface. Specific implementation details of an IHRMDma interface are described in detail in Appendix E. Appendix E also describes specific methods that associate the memory and DMA information with an HRM, so that an associated device simulator driver 373 will only have access to the shared memory and DMA resources associated with the device.

Returning again to FIG. 3A, the structure and function of other framework 300 components are next described. The root-enumerated driver 353 is a kernel mode device driver that manages a number of functions of the kernel mode framework 352. For instance, the root-enumerated driver 353 monitors the status of the kernel mode framework 352 to ensure that it is always loaded. The root-enumerated driver 353 also assists in loading new hardware device drivers into the system 200 by creating physical device objects (PDO) for simulated devices. In addition, the root-enumerated driver 353 performs other functions that assist the registration of software objects created by the framework 300.

The client object model 356 is a device-neutral object model that accesses the functions of the kernel mode framework 352 via the user mode framework 355. In one embodiment implemented in a Windows® environment, the client object model 356 is exported as a set of in-process COM objects. In-process COM objects are desirable because in-process COM objects can be used in minimal footprint systems, e.g., system where COM is not present, by directly loading a linked library containing the client object model 356 and calling the thusly exported functions. The client object model 356 functions to create, enumerate and destroy the simulated devices.

The device simulator object model 371 allows the device simulator driver 373 to expose a set of COM objects in both the user mode and the kernel mode. In a preferred embodiment, these COM objects can be implemented in the C++ programming language and configured to use the framework services to access basic operating system features in order to maintain execution mode independence. This allows a test application and its object implementations to run in either user mode or kernel mode for special testing actions such as boot, suspend, hibernate, or resume testing. In one embodiment, the device simulator object model 371 is defined in a standard COM type library that is linked as a binary resource to the device simulator driver 373. This allows the device simulator driver 373 to communicate data by invoking the framework 300 to export an object model in both the user mode and the kernel mode. One exemplary embodiment of this export method is defined in Appendix A and referenced as IDSFDriverSvcs::ExportObjects. In this example, the object models are implemented using C++ classes derived from DSF base classes, which are described in the appendices.

The framework service 354 facilitates communication when the kernel mode framework 352 requires user mode services that are not specific to a running user mode software application. The framework service 354 is configured to load a type library and register COM objects as implemented by the user mode framework 355. The COM objects are then exposed as publicly creatable objects that can be created using generally known C++ methods such as "CoCreateInstance" or by use of the VBScript method known as "CreateObject." The COM objects are also exposed as DLL interfaces if a user mode application directly calls a function to retrieve a class object from the client object model 356. The use of this configuration of COM objects allows single-threaded test applications to use the objects even if COM is not present on the system, e.g., in a scenario where the computer is made from an embedded configuration.

The system 200 also includes a parent bus driver 359. As known in the art, a parent bus driver 359 is a software component used to control the operations of a computer bus (item 26 of FIG. 1, for example). For illustrative purposes, the following examples employ a well-known parent bus driver 359, referred to in the art as PCI.SYS. As described more fully below, the PCI.SYS bus driver initiates procedures of the framework 300 to load software components such as an HRM 350.

The components of the system 200 utilize a number of different types of communication channels or interfaces 380–382, 384–386, each of which may use any one of a number of protocols known in the art. For instance, the system includes communication channels 381 between the kernel mode framework 352 and the target driver 301, the device simulator driver 373, the parent bus driver 359, and the root-enumerated driver 353 that may function in accordance with a routine known in the art as "IoCallDriver," a routine that sends an I/O request packet to drivers associated with a specified device object.

Other communication channels 380 included in the system 200 link the device simulator driver 373 to the HRMs 350. These communication channels may employ generally well known communication protocols designed to interact with hardware devices, such as a port access call or a hardware interrupt. Communication channels 382, 385 and 386 that extend between the kernel mode framework 352 and the root-enumerated driver 353 and the user mode framework 355 and the framework services may include a standard communication interface, such as an IOCTL programming interface. Other communication channels, such as the channels (383) between the device simulator object model 371 and the test application 333 and the client object model 356, may include Common Object Model (COM) interfaces, for example.

As described above, the framework 300 may be used to automate the testing of a device driver and/or an actual hardware device. In addition, the framework may be used to automate the testing of a software application that interacts with a device driver, such as an operating system. In one embodiment, the test application 333 contains instructions that cause a computer to generate a series of hardware commands. For example, in an example involving a test of a keyboard, the test application 333 may instruct a computer to command that a simulated keyboard driver or an actual keyboard driver generate signals that cause the actuation of the "caps lock" button of the related keyboard.

Figure 4:
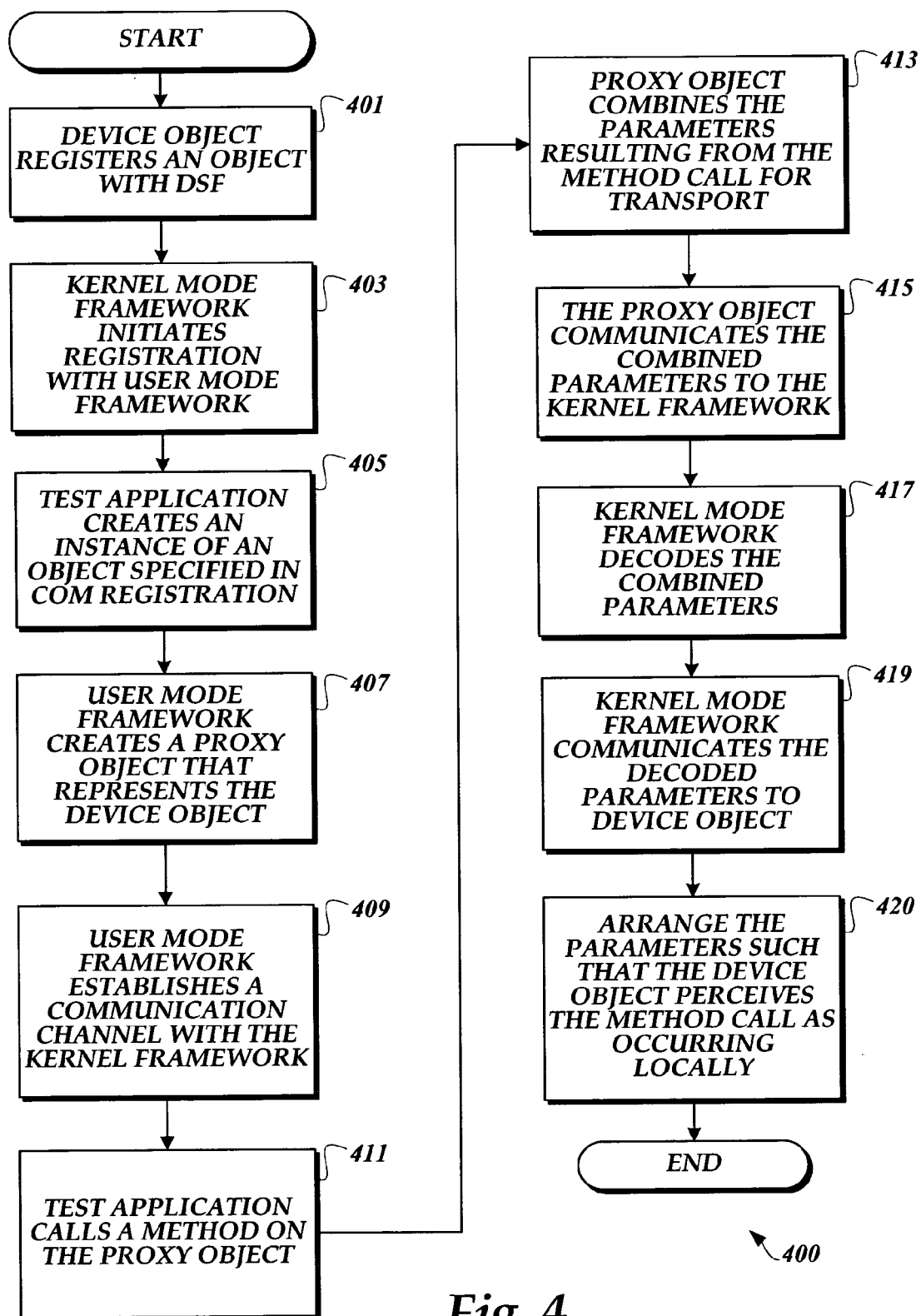
FIG. 4 is a flow diagram illustrating an exemplary embodiment of a method for providing communication between a user software object and a kernel software object according to the present invention.

As will be better understood from the following description of the flow diagram shown in FIG. 4, the test application instructions or commands are sent to the device simulator driver 373 via a communication channel 382 established by the framework 300. The communication channel 382 established by the framework 300 also allows the device simulator driver 373 and its related objects to communicate data to user mode applications, such as the test application 333. It is to be understood that the illustrative embodiment described herein is only one example of how the framework 300 can be used to facilitate communication between a test application and a keyboard driver and that the system and method of the present invention may be employed by many other applications that require communication between kernel mode objects and user mode objects.

Referring now to FIG. 4, in conjunction with the system block diagrams of FIG. 3A, an exemplary embodiment of a method 400 for establishing communication between a kernel mode object and a user mode object is described next. For illustrative purposes, the following example describes a test application 333 (FIG. 3A) transmitting a command to a device simulator driver 373 via communication channel 382. It should be understood that this is only an example and that any function of the framework 300 that requires communication between a kernel mode object and a user mode object can invoke the execution of the method 400 described below.

The method 400 starts at block 401, where a device object 391 registers with the kernel mode framework 352. The registration of process block 401 may be invoked by a number of different actions. For instance, the registration may result from a call by the test application 333 that instructs the device simulator driver 373 to execute or simulate a function of a device. In such an example, the test application 333 may instruct the device simulator driver 373 to simulate the actuation of the "caps lock" key on a keyboard device. In responding to the instruction received from the test application 333, the device simulator driver 373 will create a device object 391 that establishes the need for a communication channel 382.

In one specific embodiment, the registration process of block 401 may be carried out by calling the IClassFactory::CreateInstance method, which is well known to those of ordinary skill in the art. As will be appreciated by those of ordinary skill in the art, this method involves the generation of a unique identifier, known in the art as a "GUID," that may be associated with the device object 391. As known in the art, a GUID is used by the operating system of a computer to notify other programs that a software object is available for use. The generated GUID is stored in the kernel mode framework 352. The stored GUID allows the user mode framework 352 to identify and access the specific object identified by the GUID when calls are received by the user mode framework from user mode applications requesting the specific object.

After the device object 391 registers the device object 391 with the kernel mode framework 352, the method 400 proceeds to block 403, where the kernel mode framework 352 initiates registration with the user mode framework 355. In a Windows® specific implementation, such registration can be accomplished by the kernel mode framework 352 initiating COM registration with the user mode framework 355. As part of the registration process, the kernel mode framework 352 communicates the GUID to the user mode framework 355. After the user mode framework 355 receives the GUID, the user mode framework 355 advertises the existence of the GUID to the operating system in any conventional manner. For example, a COM mechanism can be used to advertise the existence of the GUID. Because of the registration, the COM mechanism in effect advertises the existence of the kernel mode object. As will be appreciated by those of ordinary skill in the art, the exemplary registration process described above may take different forms depending on the operating system. Those skilled in the art will also appreciate that COM registration is only one way to construct a Windows® implementation.

After the kernel mode framework 352 registers with the user mode framework 355, the method proceeds to block 405 where the test application 333 creates an instance of the object that is specified in COM registration. In this part of the process, generally known components in an operating system may be utilized to identify the instance of an object created by the test application 333. As will be appreciated by those of ordinary skill in the art, the creation of the instance of the registered object facilitates the communication of instructions produced by the test application 333. For example, the test application 333 may produce an instruction, communicated using the instance of the registered object, requesting that a function of a device being tested be carried out, such as actuating a specific key of a keyboard.

Next, at block 407, the user mode framework 355 creates a proxy object 390 that represents the kernel mode device object 391. The proxy object 390 is created in user mode and configured to appear to user mode applications as the corresponding device object 391. The proxy object 390 is configured to communicate method calls, property accesses, and events between user mode applications and the device simulator driver 373. The proxy object 390 is generated by conventional methods and associated with the GUID.

As shown in block 409, the process continues with the user mode framework 355 opening a communication channel to the kernel mode framework 352. In this part of the process, the communication channel may be established by the use of any one of a number of software communication mechanisms. As described above, in one embodiment, the communication channel formed between the user mode framework 355 and the kernel mode framework 352 may be formed by an IOCTL interface. In other embodiments, the communication channel formed in the process of block 409 may be an application programming interface for reading and writing file data streams, or other communication mechanisms such as those offered by Windows® Management Instrumentation (WMI) implementations. The communication channel is between the proxy object 390 in user address space and the corresponding device object 391 in the kernel mode address space. This communication channel, which was also described above, is depicted in FIG. 3A as channel 382.

Next, at block 411, the test application 333 calls a method on the proxy object 390. In this part of the process, the test application 333, or any other software application, may call a method on the proxy object 390 to send data, such as a function command directed to a keyboard driver, to the device object 391. Next, the process continues at block 413 where the proxy object 390 receives the call initiated in block 411 and combines the data parameters of the method call for transport over the communication channel 382 established in block 409. In this part of the process, any suitable method for marshalling data can be used to combine the data parameters of the method call for transport over the data communication channel.

Next, at block 415, the proxy object 390 sends the combined data parameters from the user mode framework 355 to the kernel mode framework 352 via the communication channel 382. In this part of the process, general IOCTL, WMI, or File I/O communication commands may be used. In alternative embodiments, any other suitable communication protocol for communicating data between user mode and kernel mode may be used. Upon completion of the process of block 415, the kernel mode framework 352 receives the combined data parameters for processing. As shown in block 417, the kernel mode framework 352 decombines the combined parameters to obtain the data parameters of the method call produced by the test application 333. In the process of block 417, any decombining method that is compatible with the combining method used in the process of block 413 may be used to facilitate this part of the process. Next, at block 419, the decombined data parameters are communicated to the device object 391 for processing. Once received by the device object, the data parameters may be used by a hardware device driver, a device simulator driver, or any other software component that is associated with the device object 391.

As shown in block 420, the decombined data parameters are arranged such that the device object 391 perceives the method call (generated in block 413) as occurring locally. This can be carried out by communicating the data parameters to the device object 391 by the use of a standard subroutine calling mechanism of a host processor. In one embodiment of the process of block 420, the decombined data parameters are arranged in memory as defined by a processor architecture for a subroutine call and calling the target function on the device object 391 so that the call appears to the device object 391 as a local subroutine call. For purposes of implementing this part of the process, the memory used to store the arranged data parameters includes any memory device of a computer, including the registers of a CPU.

As described above, the communication channel 382 may be a bidirectional communication path established between an object operating in the user address space of an operating system and an object in the kernel address space. This type of communication, for example, would be needed when a computer component, such as the device simulator driver 373, receives an interrupt from a hardware device. Thus, data, including data in the form of a software object, can be sent from the device object 391 to the proxy object 390 by the use of the communication channel 382, thereby communicating interactions such as the receipt of the interrupt. In this process, the device object 391 receives data parameters generated by a computer component, such as the device simulator driver 373, and combines the received data parameters for transmission over the communication channel 382. The proxy object 390 then receives the combined data parameters and decombines the combined data parameters for processing of the data parameters by the proxy object 390.

As summarized above, the present invention is also directed to a system and method for providing an extensibility model to create device simulators. The present invention also provides a framework that facilitates the software simulation of hardware suitable for use in testing of the related hardware and associated software components, e.g., drivers. More specifically, the system and method provide a generalized framework for the software simulation of hardware devices controlled by Windows® Driver Model (WDM) drivers with user and kernel mode programmability. In addition, the framework contains generic elements that provide mechanisms for redirection of hardware interaction as well as services for device-specific simulation code.

Figure 5:
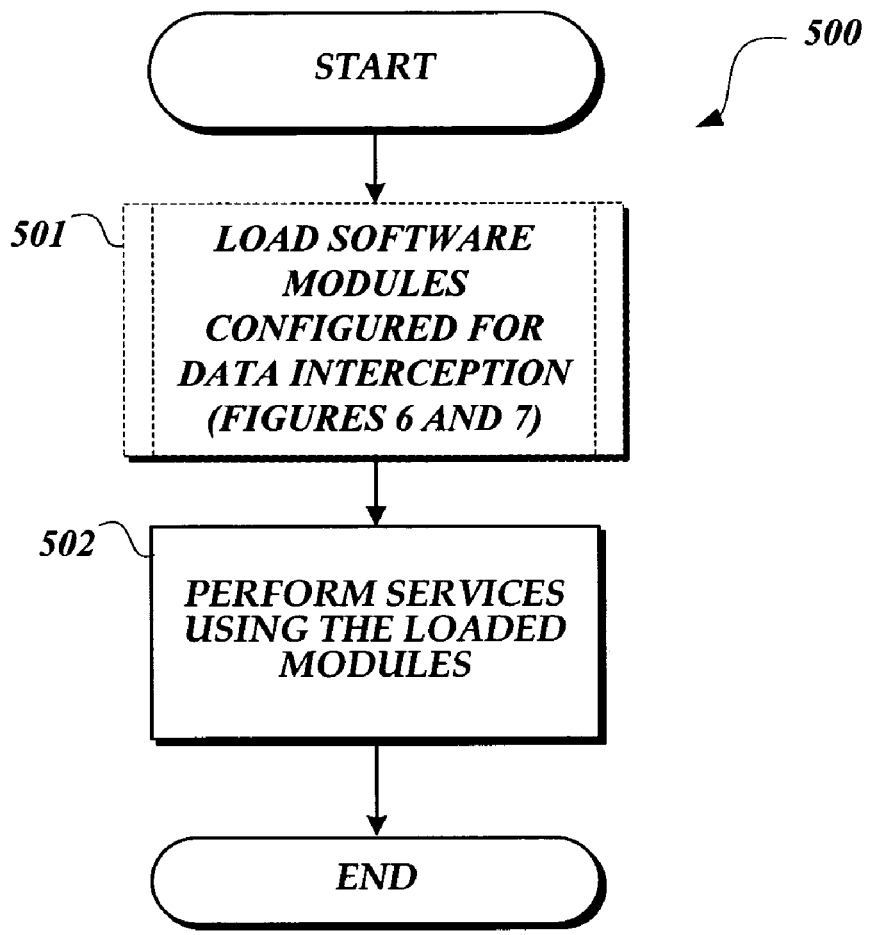
FIG. 5 is a block flow diagram illustrating an exemplary method for processing data in a system for simulating or monitoring the functions of a simulated hardware device according to the present invention.

FIG. 5 is an overview diagram that illustrates an exemplary hardware communication data processing method 500 formed in accordance with the present invention. The hardware communication data processing method 500 provides a number of operations and services that facilitate the testing of hardware devices and hardware device drivers. In one mode of operation, the framework 300 captures data that is communicated between the target driver 301 and a related hardware device (not shown). In other modes of operation, the framework 300 is used to simulate a hardware device and capture data that is communicated between the target driver 301 and the simulated hardware device. As also described below, the framework 300 provides a number of services that may be performed on the captured data. Generally described, the hardware communication data processing method 500 comprises loading a software module configured to capture data directed to a target driver, and the hardware communication data processing method 500 further comprises processing data that is captured by the loaded software module.

Figure 6:
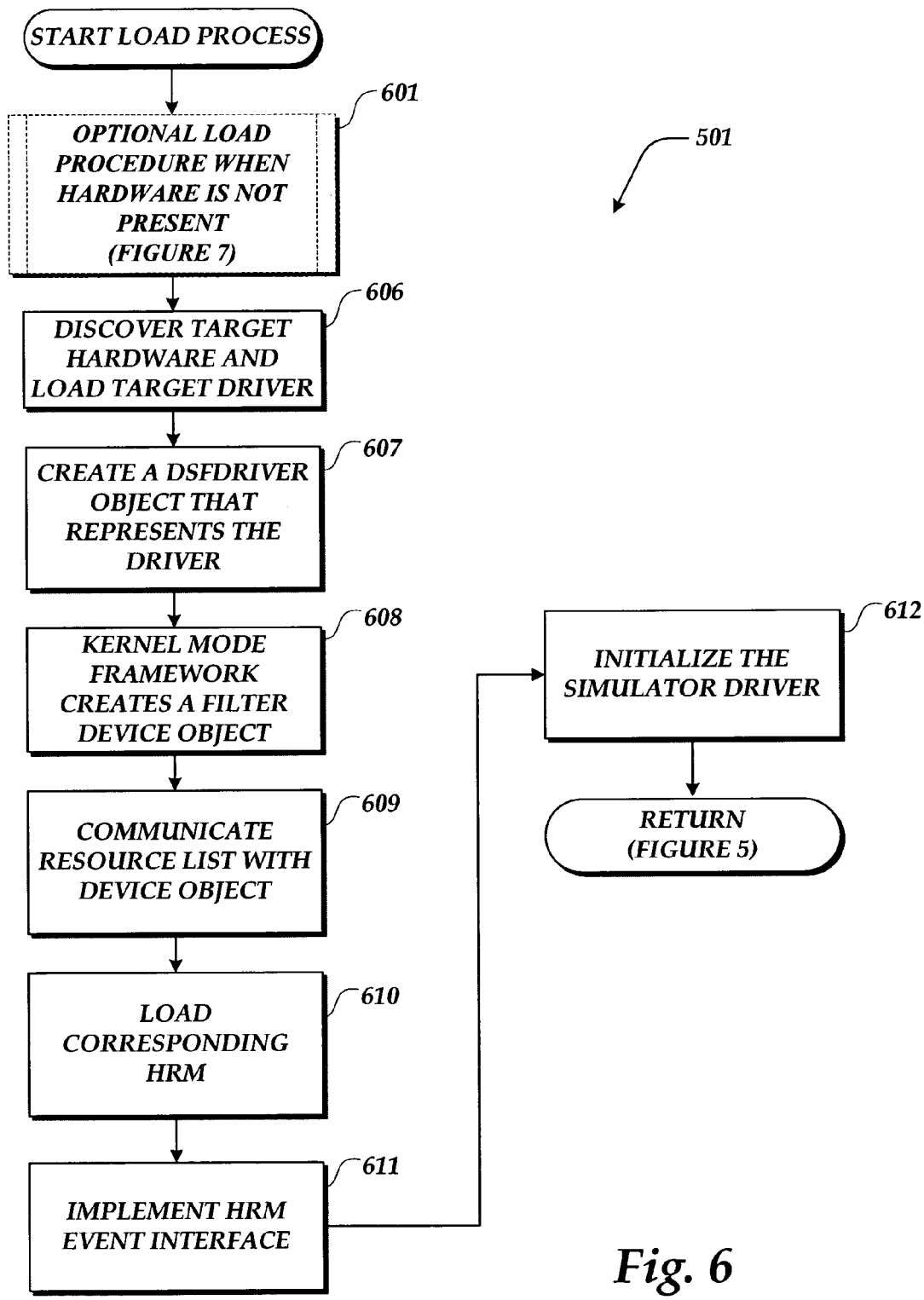
FIG. 6 is a block flow diagram illustrating an exemplary method for loading a software module for providing redirection of hardware interaction, suitable for use in FIG. 5.
Figure 7:
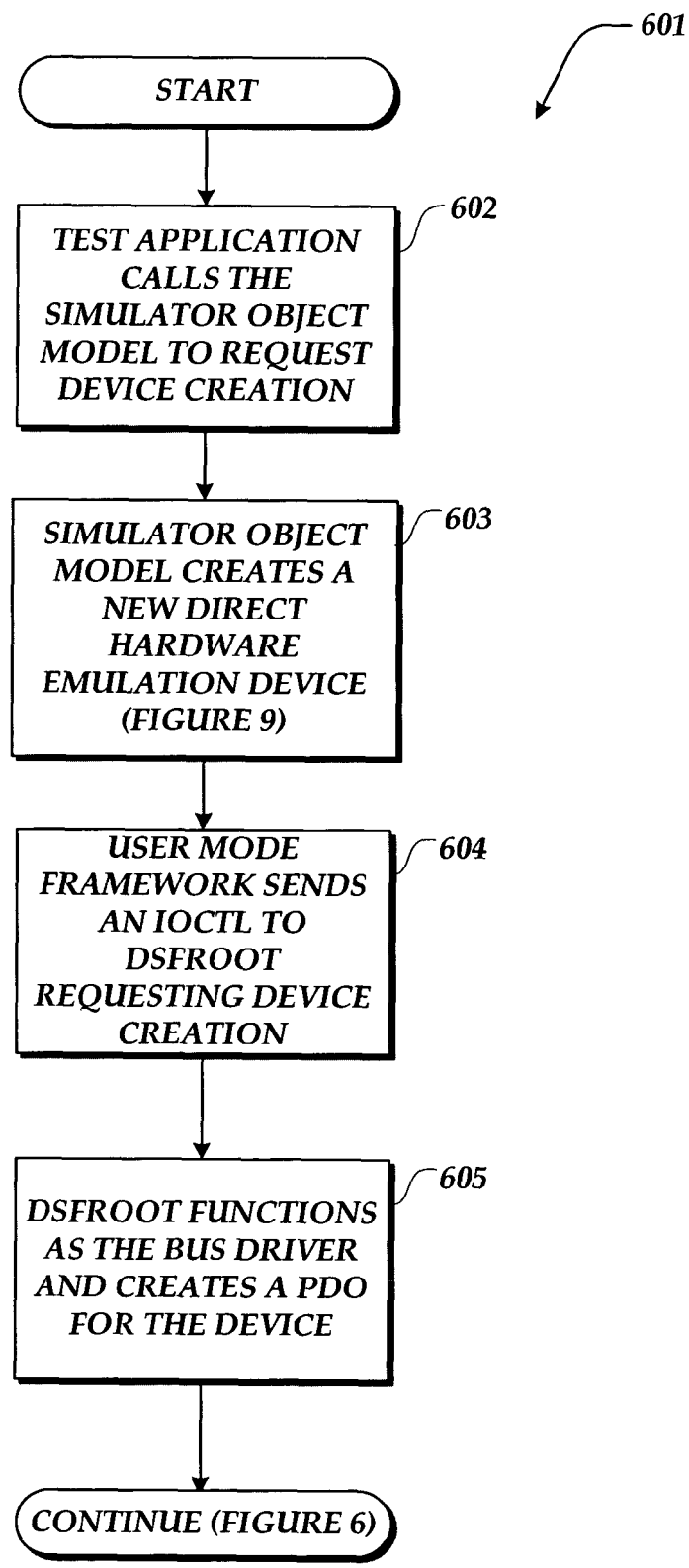
FIG. 7 is a block flow diagram illustrating an optional load procedure for the method illustrated in FIG. 6.

The hardware communication data processing method 500 begins at block 501 where the framework 300 loads software modules having the functionality to capture data communicated with target driver 301. FIGS. 6 and 7 illustrate one embodiment of a method 501 for loading software modules that are used to capture data communicated with the target driver 301. Specifically, FIG. 6 illustrates one embodiment of a load method 501 that is used when an actual hardware device, such as a keypad or mouse, is physically connected to (or installed in) the computer. FIG. 7 illustrates additional actions of an optional load procedure 601 that are executed when the hardware is not connected to (or installed in) the computer.

Figure 3B:
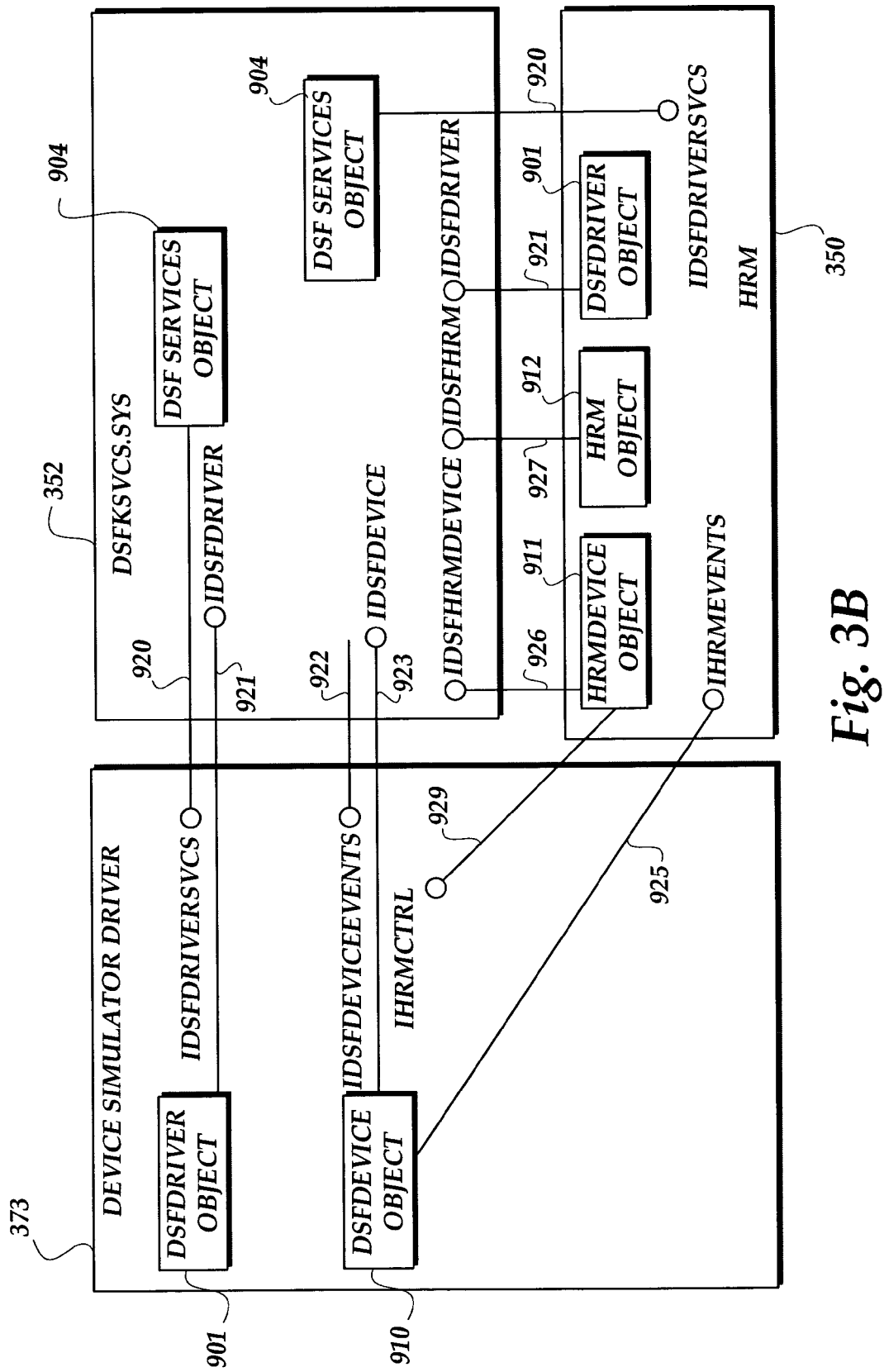
FIG. 3B is a schematic diagram illustrating a plurality of software objects and interfaces created by the software components depicted in FIG. 3A.

Prior to describing the optional load procedure 601, the following provides a brief overview of the software objects, which are illustrated in FIG. 3B, which are utilized by the methods described below. FIG. 3B illustrates another layer of communication that is established between the components of the system 200. More specifically, FIG. 3B illustrates a number of software objects that are created by the device simulator driver 373, the kernel mode framework 352, and one HRM 350. As will be appreciated by those of ordinary skill in the art, the lines shown in FIG. 3B that extend from the illustrated objects are conventional symbols that represent the interfaces of the corresponding software object. Thus, FIG. 3B also illustrates the object interfaces that provide communication between the objects and their associated software components. The following description describes how the objects and interfaces are created and how they are used to communicate data between the components of the framework 300.

A DSFDevice object 910, created by the device simulator driver 373, is used to represent a hardware device being simulated. The DSFDevice object 910 is configured to provide information about the status of events that are simulated by the device simulator driver 373. The DSFDevice object 910 communicates to the kernel mode framework 352 via an IDSFDevice interface 923. In one embodiment, a DSFDevice object 910 is created by calling the method referred to as IDSFDriver::AddDevice. Once created, the DSFDevice object 910 holds device-scope state information, such as register contents and other like information. The framework 300 then sets device properties and passes device-specific events through the IDSFDevice interface 923 on the DSFDevice object 910. The DSFDevice object 910 receives hardware access events through any interface it implements for communication with the HRM 350, such as an interface referred to as IHRMEvents interface 925.

A DSFDriver object 901, which is also created by the device simulator driver 373, is a COM object that represents the driver of a simulated device. An IDSFDriver interface 921 is used by the DSFDriver object 901 to inform the kernel mode framework 352 of driver scope events, e.g., that a new device has been created, etc. The DSFDriver object 901 also exposes a class object implementing IClassFactory if the device simulator driver 373 exports an object model by the use of the method referred to as IDSFDriver::GetClassObject.

The DSF services object 904 is created when the device simulator driver 373 calls the DSF API function referred to as DSFRegister. The framework 300 uses the DSF services object 904 to hold driver-scope state information for the calling driver, e.g. currently exported objects. In addition, the DSF services object 904 offers driver-scope services to the device simulator driver 373 through the main interface, i.e., the IDSFDriverSvcs interface 920, through which all services and other interfaces are acquired.

Each HRM 350 includes a module-scope object, referred to herein as an HRM object 912. The HRM object 912 implements IDSFHrm, which is defined in Appendix A, and utilizes an IDSFHrm interface 927 for communication. The HRM object 912 also handles HRM-scope initialization and termination, as well as device-scope object creation. Each HRM 350 also includes a device-scope object, which is referred to herein as an HRMDevice object 911. The HRMDevice object 911 implements IDSFHrmDevice, as defined in Appendix A, and communicates with the kernel mode framework 352 via an IDSFHrmDevice interface 926. The HRMDevice object 911 is used to associate the HRM 350 with the context of a corresponding DSFDevice object 910. The IHRMCTLR interface 929 is used by the device simulator driver 373 to control the behavior of the HRM device object 911.

Referring now to FIG. 6, the load method 501 begins at block 601, where the optional load procedure executes. This optional load procedure 601, which may be manually or automatically executed, is used when a hardware device is not installed, disabled, or when the hardware device is not enumerated by a bus driver, such as a PCI bus driver. By way of background, when a device is installed in a conventional computer having a PCI bus driver, the PCI bus driver creates a Physical Device Object (PDO) for the target driver of the installed hardware. Conversely, when a hardware device is not installed, or when it is disabled, a PDO is not created. Thus, when a hardware device is not installed, the optional load procedure 601 assists in the production of a PDO for an absent (completely simulated) device. While this example uses a PCI bus driver as the bus enumerator, as those skilled in the art will understand, any bus driver that creates a PDO for a newly discovered device falls within the scope of the present invention. For illustrative purposes, PCI is used in this example because a PCI is used by many direct hardware emulation devices, which are well known in the art.

FIG. 7 illustrates an exemplary embodiment of an optional load procedure 601 suitable for use in FIG. 6. Although the following illustrative example utilizes a test application to initiate the procedure 601, any other process or system component capable of producing a signal to initiate a software load procedure falls within the scope of the present invention. The optional load procedure 601 begins at block 602, where the test application 333 (FIG. 3A) calls the device simulator object model 371 to request the creation of a device simulator. In this part of the process, the command generated by the test application 333 may be in any format, so long as the call causes the device simulator object model 371 to initiate a process for creating a device simulator. Since the general components of a test application 333 are known in the art, the detail of a test application and the methods used to create a test application are not disclosed herein.

Figure 9:
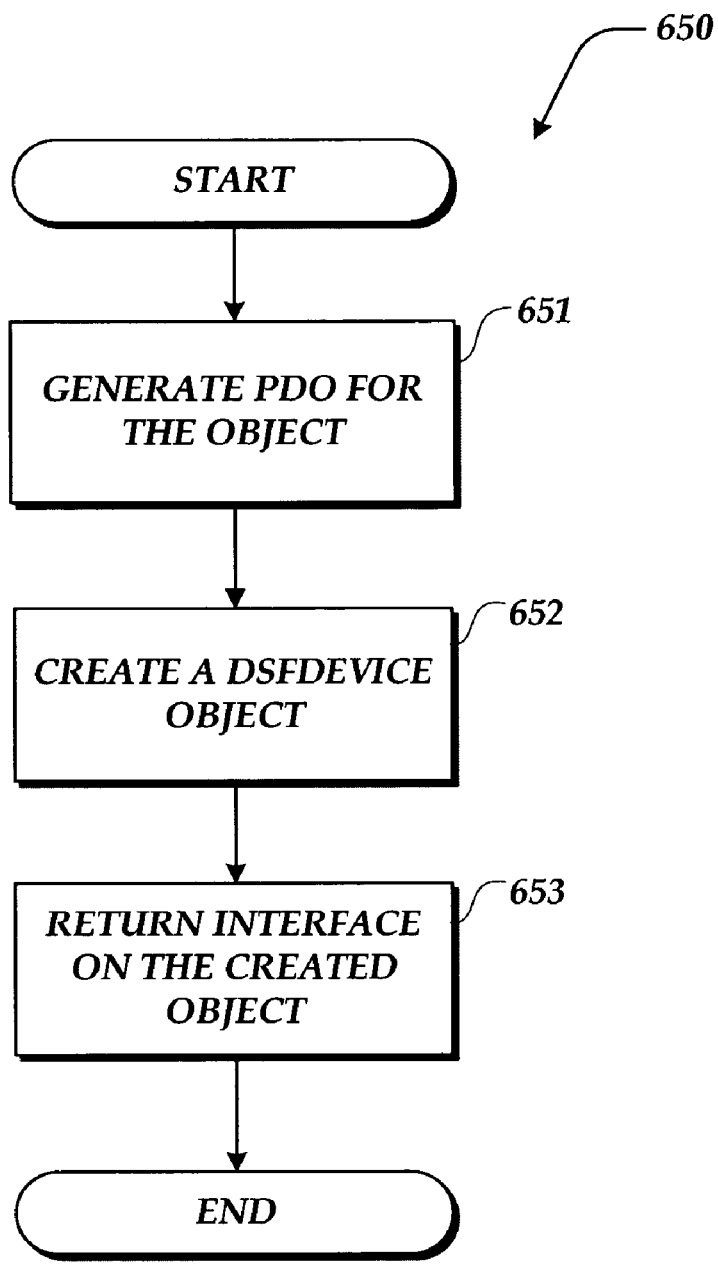
FIG. 9 is a block flow diagram illustrating an exemplary method for creating an object used for device simulation according to the present invention.

Next, as shown in block 603, the device simulator object model 371 invokes a command to a direct hardware simulation device, e.g., a simulated IDE controller. The direct hardware simulation device is created to manage all of the direct computer resources, such as a port access call, interrupt, etc. In one embodiment, the direct hardware simulation device may be an object of the device simulator driver 373. For example, the device simulator object model 371 creates a direct hardware emulation device by invoking the command referred to as IDSF::CreateDevice. As shown in FIG. 9, the IDSF::CreateDevice method creates a DSFDevice object 910 and an IDSFDevice interface 923 for allowing the DSFDevice object 910 to communicate with the kernel mode framework 352.

FIG. 9 illustrates the functions performed during the creation of a DSFDevice object 910. As shown in block 651, the IDSF::CreateDevice method creates a command that generates a PDO for the object that causes the device simulator driver 373 to load. A detailed example of this process is continued in Appendix A. Next, as shown in block 652, the device simulator driver 373 creates a device object for the new device and an interface on the created object. As shown in block 653, the interface of the new object is then returned.

Returning to block 603 of FIG. 7, if a Windows® implementation is involved, the framework 300 also calls a CreateFile function on a symbolic link for the root-enumerated driver 353. As will be appreciated by those of ordinary skill in the art, the CreateFile function creates or opens a file, directory, physical disk, volume, or the like and returns a handle that can be used to access the object created in the process of block 603.

Next, as shown in block 604, to the user mode framework 355 sends a command to the root-enumerated driver 353, also referred to as the DSFRoot, requesting the device creation of a PDO. As will be appreciated by those of ordinary skill in the art, this command may utilize, for example, the well known function referred to as IOCTL( ). Next, at block 605, the root-enumerated driver 353 responds to the request and creates a PDO for the hardware device. This part of the process essentially replaces the actions that would be taken by a bus driver when it creates a PDO for a device. Once a PDO is created, it responds to each IRP (I/O Request Packet) for each device ID, resource list, and device capabilities. As will be appreciated by those of ordinary skill in the art, an IRP is a standard mechanism for facilitating messaging and data transfer procedures for device drivers within Windows®. After the creation of the PDO, the optional load procedure 601 returns to the load method load method 501 shown in FIG. 6.

Returning to FIG. 6, after the optional load procedure 601 is completed, the hardware communicates with processing method 500 proceeds to block 606. Alternatively, if a hardware device is installed in the computer and enumerated by the framework 300, the hardware communication data processing method 500 starts with block 606. At block 606, the parent bus driver 359 discovers the target hardware, e.g., a controller card such as a USB controller, during normal operation of a plug-and-play (PNP) enumeration process, for example. In a Windows® implementation, a PNP enumeration process automatically occurs if the parent bus driver 359 utilizes a generally known application referred to in the art as PCI.SYS. When the parent bus driver 359 discovers the target hardware, the parent bus driver 359 initiates the loading of the target driver 301. The target driver 301 may be a combination of known target drivers, such as "USB-PORT.SYS and "USBEHCI.SYS." In this part of the process, by the actions of the parent bus driver, a device simulator driver 373 and a target driver 301 are retrieved from the computer's memory and loaded as a lower filter.

Next, as shown in block 607, the device simulator driver 373 creates a DSFDriver object 901 and registers the DSFDriver object 901 with the framework 300 by calling the DSF API function referred to as DSFRegister. This process involves the execution of a "DriverEntry" routine that, as known in the art, is the first routine that is called after a driver is loaded in an operating system. During the execution of the DriverEntry routine, the device simulator driver 373 creates DSFDriver object 901 and a DSFDriver interface 921 for communicating data to the kernel mode framework 352. The IDSFDriver interface 921 is used to inform the device simulator driver 373 of driver-scope events, e.g., that a new device is created or that the device simulator driver 373 is being unloaded. Thus, the DSFDriver object 901 is also configured to store driver-scope state data, e.g., a list of simulated devices, and to receive driver-scope events from the kernel mode framework 352.

In one embodiment, the DSFDriver object 901 is also the source of COM class objects implementing an IClassFactory interface if the device simulator driver 373 exports an object model. In this embodiment, one of the framework components calls a routine referred to as IDSFDriver::GetClassObject when an application sends a request to create a COM object exposed by the driver.

In the process of block 607, the device simulator driver 323 also calls a "DSFRegister" method that passes DRIVER_OBJECT and IDSFDriver interface data to the kernel mode framework 352. The kernel mode framework 352 sets its own entry points in DRIVER_OBJECT, and calls IDSFDriver::Initialize to pass an IDSFDriverSvcs pointer 920 on an object that exposes the framework's kernel mode services to the device simulator driver 373. The device simulator driver 373 uses the pointer to execute functions when the kernel mode framework 352 calls interface methods implemented by the device simulator driver 373.

In the process of block 607, the device simulator driver 373 receives a call for an identifier, by the use of the method referred to as IDSFDriver::GetID. As described in Appendix A, this method returns a GUID that is used to identify the device simulator driver 373. The GUID is used by the user mode framework 355 and the kernel mode framework 352 to identify any calling driver.

As shown in block 608, the kernel mode framework 352 also creates a filter device object. Generally described, the framework components use the filter device object to represent the simulated device. In addition, the filter device object is used to store associated context. In one exemplary embodiment of this part of the process, the Windows® method referred to as "AddDevice" is called. As will be appreciated by those of ordinary skill in the art, the "AddDevice" routine is responsible for creating functional device objects (FDO) or filter device objects (FilterDO) for devices enumerated by a Plug and Play (PNP) manager.

For a Windows® implementation of the present invention, the process of block 608 also calls on a method for creating a DSFDevice object 910. As described above, the DSFDevice object 910 is used to represent the simulated hardware device and to communicate and store data describing events that are simulated by the device simulator driver 373. In one specific embodiment, a DSFDevice object 910 is created by calling the method referenced in Appendix A as IDSFDriver::AddDevice.

As shown in FIG. 3B, the DSFDevice object 910 implements the IDSFDevice interface 923 and any interfaces needed by any HRM 350, such as an IHRMEvents interface 925. After the DSFDevice object 910 is created, the method referred to as IConnectionPoint::Advise is called on the DSFDevice object 910 to establish the IDSFDeviceEvents interface 922. The IDSFDeviceEvents interface 922 allows the DSFDevice object 910 to communicate event data to the framework 300 components, test application 333, or to an HRM 350.

Returning to the flow diagram of FIG. 6, the process continues at block 609 when the kernel mode framework 352 creates a resource list and communicates the resource list to the DSFDevice object 910. As will be appreciated by those of ordinary skill in the art, a resource list can be obtained from one or more resources of an operating system, including a resource known in the art as CM_RE-SOURCE_LIST, a structure that specifies all of the system hardware resources assigned to a device. In one actual embodiment, the kernel mode framework 352 obtains the resource list from an IRP that is referred to in the art as IRP_MN_START_DEVICE data. As a matter of background, the PNP Manager sends the IRP_MN_START_DE-VICE data after the PNP Manager has assigned hardware resources, if any, to the device. As also known in the art, the PNP Manager sends this IRP after a device has been enumerated or if the device may be restarting after having been stopped for resource rebalancing.

The processing of the IRP_MN_START_DEVICE data begins by the target driver 301 passing the IRP to the kernel mode framework 352. In turn, the kernel mode framework 352 creates HRMDevice objects 911 for each resource type in the device's resource list and stores their "IUnknown" interfaces in an object hierarchy that contains the resource information from the CM_PARTIAL_RESOURCE_LIST structure. The kernel mode framework 352 then calls a routine to give the resource list to the HRM, an exemplary method defined in Appendix A and referred to as IDSFHrm-Device::Initialize. Another routine, referred to as IDSFDevice::put_Resources, may be called to give the resource list to the device simulator driver 373.

Figure 10:
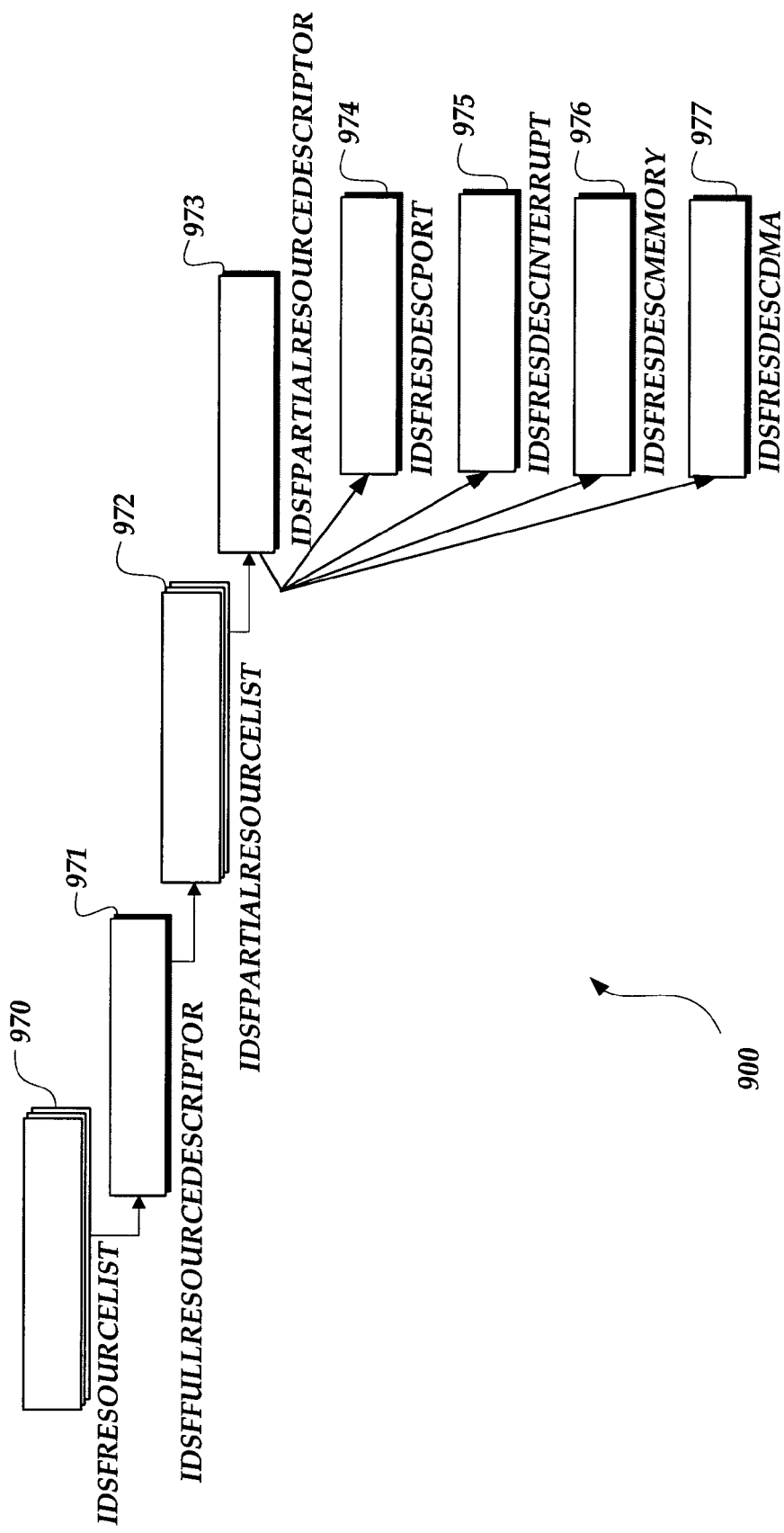
FIG. 10 is a block diagram of a hardware resource list object hierarchy for specifying hardware resources assigned to a device, according to the present invention.

To facilitate the communication of resource list data, the present invention provides a number of interfaces for objects that contain resource list data. FIG. 10 illustrates one embodiment of a hierarchy of objects that is used to relate specific types of resource list data. Each block illustrated in FIG. 10 represents an interface of a resource list data object having specific information related to the resources of a hardware device. The types of data related to each interface will now be described.

An IDSFResourceList interface 970 is the main interface on the top level object of the hierarchy of objects that contains the information from a data structure that specifies all of the system hardware resources assigned to a device. As can be appreciated by those of ordinary skill in the art, a data structure that specifies all of the system hardware resources is known in the art as CM_RESOURCE_LIST, which is a data structure utilized by many operating systems. In the implementation of the IDSFResourceList interface 970, a number of methods may be utilized to return properties stored in each object. For instance, the method referred to as IDSFPartialResourceDescriptor::get_Descriptor returns a polymorphic property containing an IUnknown on an object that describes the particular resource. In such an embodiment, the object is identified by the property returned by a method referred to as IDSFPartialResourceDescriptor::get_Type. As can be appreciated by those of ordinary skill in the art, these methods, and others listed below, may inherit methods from the interface referred to in the art as IUnknown.

An IDSFFullResourceDescriptor interface 971 is the main interface on an object that contains the information from a data structure that specifies a set of system hardware resources of various types, i.e., those assigned to a device that is connected to a specific bus. As can be appreciated by those of ordinary skill in the art, such a data structure is referred to as CM_FULL_RESOURCE_DESCRIPTOR, a data structure that is contained within the CM_RE-SOURCE_LIST data structure. In an exemplary embodiment, the IDSFFullResourceDescriptor interface 971 may contain a number of methods for accessing the resource data, such as a get_InterfaceType, get_BusNumber, and get_PartialResourceList.

An IDSFPartialResourceList interface 972 is the main interface on an object that contains information from a data structure that specifies a set of system hardware resources assigned to a particular device. One known data structure that specifies a set of system hardware resources assigned to a particular device is known in the art as CM_PARTIAL_RESOURCE_LIST. In an exemplary embodiment, the IDSFPartialResourceList interface 972 may comprise a number of methods for retrieving version, revision, count, and item data.

The IDSFPartialResourceDescriptor interface 973 is the main interface on an object that contains information from a data structure that specifies one or more system hardware resources of a single type, assigned to a device. Such a data structure is known in the art as the CM_PARTIAL_RE-SOURCE_DESCRIPTOR. The IDSFPartialResourceDescriptor interface 973 may have a number of methods for obtaining the type, ShareDisposition, flags, descriptor, and HRM information.

The IDSFResDescPort interface 974 is the main interface on the object that contains the port resource information from the CM_PARTIAL_RESOURCE_DESCRIPTOR structure. The IDSFResDescPort interface 974 consists of a number of methods to obtain information related to a port, such as start and length information. The IDSFResDescInterrupt interface 975 is the main interface on the object that contains the interrupt resource from the CM_PARTIAL_RE-SOURCE_DESCRIPTOR structure. The IDSFResDescInterrupt interface 975 comprises a number of methods to obtain information related to an interrupt, such as level vector and affinity information.

The IDSFResDescMemory interface 976 is the main interface on the object that contains the memory resource information from the CM_PARTIAL_RESOURCE_DE-SCRIPTOR structure. This interface 976 comprises a number of methods to obtain information related to a memory resource, such as "start" and "length" information. The IDSFResDescDMA interface 977 is the main interface on the object that contains the DMA resource information from a CM_PARTIAL_RESOURCE_DESCRIPTOR_structure. This interface 977 comprises a number of methods for obtaining channel port data, reserved data, etc.

Returning now, as shown in block 610, the method 501 also includes loading one or more HRMs for capturing and redirecting data communicated with the simulated device. In this part of the method, the device simulation framework 300 loads a corresponding HRM for each resource that is used by the simulated device. In one embodiment, the device simulation framework 300 may determine the types of HRMs based on an analysis of the resource list obtained in block 609. For instance, in an example involving a simulated keyboard, the device simulation framework 300 would receive a resource list indicating that a simulated device utilizes hardware interrupts. Thus, device simulation framework 300 would load an HRM configured to manage hardware interrupts.

Once one or more HRM's are loaded, the method 501 continues at block 611 where device simulation framework 300 implements an HRM event interface. Block 611 may involve any known process for establishing connection points between software objects. In one specific example, a method known in the art as IConnectionPoint::Advise is called on the loaded HRM to establish an interface, such as the IHRMEVENTS interface 925 (FIG. 3B). In a system involving redirection for non-PNP resources, e.g., one involving Advanced Configuration and Power Interface (ACPI) operational regions, the process of block 611 also creates an interface on an HRMDevice object for a specific device and resource type. In one working example of this procedure, the method referred to herein as IDSFDriverSvcs::CreateHrmDevice may be called to establish suitable interfaces for a simulated hardware device having non-PNP resources.

As shown in block 612, the method 501 further comprises an initialization of the device simulator driver 373. In this part of the process, if the device simulator driver 373 requires an initial state before responding to any hardware access, the device simulator driver reads its state from any one of a number of possible resources, such as a file, an operating system registry, the boot time state storage, etc. Upon completion of the process of block 612, processing returns back to the flow diagram shown in FIG. 5 where one or more functions of the loaded software modules are performed.

Referring again to FIG. 5, upon the completion of the software module load method 501, the processing method 500 continues at block 502, where the loaded HRMs 350 are utilized by the framework 300 to perform one of a number of services. For example, as described below, the framework components may be configured to operate in several different modes to intercept and/or record data to simulate a hardware device while recording data for additional testing methods. In other examples described below, the framework 300 and HRMs can be used to facilitate the simulation of a device, test a device, or perform other operations that facilitate test procedures.

In one specific application, the framework 300 and the device simulator driver 373 can also (1) capture, i.e., intercept and record, data communicated between a hardware device and a hardware device driver; (2) simulate the functions of a hardware device; or (3) simulate the functions of a hardware device while capturing data communicated between a hardware simulator and a hardware device driver.

When the framework 300 operates in a capture mode, a hardware device is connected to (or installed in) the computer. For example, this mode of operation may be used to capture the data interaction between a USB EHCI miniport and an EHCI controller. Each time the hardware device or the hardware device driver communicates data, the above-described HRMs capture the data for processing. Once captured, the HRMs can optionally log the captured data to a device simulator driver, and optionally forward the captured data to a hardware device.

In addition to capturing data, the framework 300 may also combine the captured data with other data, such as a time stamp. For example, a hardware device that makes an access call may request the framework to log a data packet of "wrote 0x0400 to port 0x78F1 at 12:22:03.17." If a device simulator driver 373 is present, the framework may be configured to communicate this captured data to the device simulator driver 373 for storage and further processing. The device simulator driver 373 may record the data and then define the frequency and format of the data. One example of formatted data may involve "raw and cooked data," that may include commands and appear as "set controller stop bit as 11:01:44.23." This embodiment of data capture may be used for compliance monitoring to determine if the target driver 301 is functioning properly.

When the framework 300 operates in simulation mode, the device simulator driver 373 simulates the basic functions of the simulated device as described above. In this mode of operation, the data captured by the HRMs is forwarded to the device simulator driver 373 for processing. If the actual hardware device is physically attached to (or installed in) the computer, the HRMs ignore the presence of the actual hardware device.

When the framework 300 operates in capture and simulation mode, the hardware device may be physically present but is not used. In this mode of operation, the framework components intercept the data as described above, log the intercepted data, and forward the data packets to the device simulator driver 373.

The operating modes of the framework 300 can be controlled by a number of known software controlled mechanisms. In one embodiment, data describing a default operating mode can be stored in any one of the components of the framework 300, a registry key, or any other storage device that is accessible by the framework 300. Thus, when a device simulator driver 373 is created, the framework 300 can access the data describing the default operating mode and operate in accordance with the stored default value. The device simulator driver 373 can either accept the default mode or change it, depending on the needs of the test application.

Figure 8:
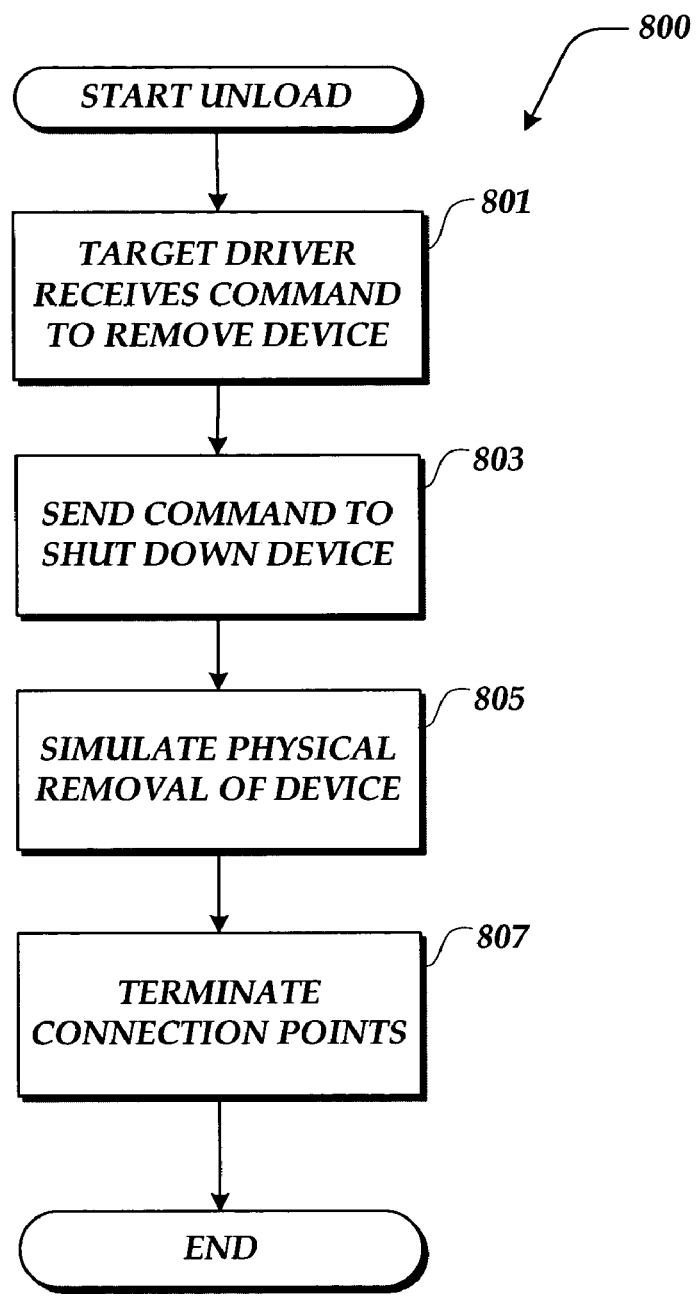
FIG. 8 is a block flow diagram illustrating an exemplary method for unloading a software driver, according to the present invention.

In another example involving the simulation mode, among an infinite number of test routines or functions that may be configured in a test application, one test routine may involve the simulation of the removal of a hardware device. FIG. 8 illustrates one example of a method for simulating the physical removal of a hardware device. As described in more detail below, the described simulation of the physical removal of a device includes one scenario where the device is removed after it is deactivated by the system, and another scenario where the device is removed without deactivation, referred to as a surprise removal.

The unload method 800 shown in FIG. 8 begins at block 801, where the target driver 301 receives a command to remove the device. For example, a test application 333 may send a command to remove the device. An exemplary command known in the art is IRP_MN_REMOVE_DEVICE.

Next, as shown in block 803, when the target driver 301 receives the IRP_MN_REMOVE_DEVICE command, the target driver sends hardware commands to the device to shut it down. In a scenario involving a Windows® implementation, the test application 333 may also disable the device by the use of the Windows® device manager or use a plug-and-play (PNP) application programming interface (API) to request removal of the device. In the Windows® implementation, the test application may utilize a command that is known in the art for actually removing the hardware, such as SetupDiCallClassInstaller (DIF_PROPERTYCHANGE, DICS_DISABLE) in user mode or IoRequestDeviceEject in kernel mode. At that point, the hardware device is no longer in operational mode, but may still be physically present in the computer.

After the device has been shut down, the unload method 800 continues at block 805, where the system simulates the physical removal of the hardware device. In order to simulate physical removal of the device, the test application 333 resets the "Inserted" property of the device by calling a suitable method, such as the method referred to as IDSFDevice::put_Inserted. As described in Appendix A, the IDSFDevice::put_Inserted method indicates whether the simulated device's hardware appears present in the system. In response to the reset of the Inserted property, a hardware initiate, such as a method referred to as IDSFDeviceEvents::Removed, instructs the framework components that the device has been removed.

Next, as shown in block 807, when the framework components, namely, the kernel mode framework 352, receives the IDSFDeviceEvents::Removed command, the kernel mode framework calls a suitable method, referred to as IDSFDevice::Terminate. As described in Appendix A, the IDSFDevice::Terminate method allows the device simulator driver 373 to terminate its connection points and perform other device-scope cleanup procedures. When the IDSFDevice::Terminate method returns, the kernel mode framework 352 releases its IDSFDevice pointer. Upon the completion of the process of block 807, the unload method 800 terminates.

To implement a surprise removal simulation, the test application 333 does not communicate a command to initiate the PNP mechanism for requesting the removal of the device. Instead, the test application 333 initiates the process by invoking a command that resets the device's "Inserted" property, as described above with respect to block 805. This property change notifies the device simulator driver 373 to manipulate its hardware interface in order to make the device appear inoperative or missing. At this point, if there is an actual hardware device installed in the computer, it should be physically removed in order to initiate other procedures carried out by the operating system for final cleanup.

If an actual hardware device is not present in the system, the kernel mode framework 352 initiates a command to the root-enumerated driver 353 to simulate the physical removal. In one specific embodiment, the root-enumerated driver 353 calls a generally known method referred to as IoInvalidateDeviceRelations to request that the PNP manager re-enumerate its simulated bus. As will be appreciated by those of ordinary skill in the art, the PNP manager would respond by sending data referred to as IRP_MN_REMOVE_DEVICE for the PDO. Use of the above-described method allows the simulation of the removal of a device to be achieved.

While several embodiments of the invention have been illustrated and described, it will be appreciated that various changes can be made therein without departing from the spirit and scope of the invention. Similarly, any process steps described herein might be interchangeable with other steps in order to achieve the same result. In addition, the illustrative examples described above are not intended to be exhaustive or to limit the invention to the precise forms disclosed.

APPENDIX A

Kernel Mode Interfaces for Simulator Drivers

The following interfaces are defined for communication between simulator drivers and DSF kernel mode services. All COM interfaces derive from IUnknown unless otherwise stated.

Interfaces and functions implemented by DSF:

DSFRegister—registration function called by simulator driver in its DriverEntry routine IDSFDriverSvcs—main interface through which all services and other interfaces are acquired.

IDSFDeviceEvents—implements device-scope events fired by the DSFDevice object.

IDSFLog—secondary interface on the DSFKSvcs object that provides kernel mode logging services IDSFMalloc—memory allocator similar to COM's IMalloc IDSFDeviceCaps—interface on an object that defines a device's PNP and power capabilities IDSFResourceList—interface on top of object hierarchy that contains the information from CM_RESOURCE_LIST structure.

IDSFullResourceDescriptor—interface on an object that contains the information from a CM_FULL_RESOURCE_DESCRIPTOR structure.

IDSFPartialResourceList—interface on an object that contains the information from a CM_PARTIAL_RESOURCE_LIST structure.

IDSFPartialResourceDescriptor—interface on an object that contains the information from a CM_PARTIAL_RESOURCE_DESCRIPTOR structure.

IDSFResDescPort—interface on an object that contains the port resource information from a CM_PARTIAL_RESOURCE_DESCRIPTOR structure.

IDSFResDescInterrupt—interface on an object that contains the interrupt resource information from a CM_PARTIAL_RESOURCE_DESCRIPTOR structure.

IDSFResDescMemory—interface on an object that contains the memory resource information from a CM_PARTIAL_RESOURCE_DESCRIPTOR structure.

IDSFResDescDMA—interface on an object that contains the DMA resource information from a CM_PARTIAL_RESOURCE_DESCRIPTOR structure.

IDSFVersion—allows simulator drivers and client applications to determine DSF version information.

IDSF—interface on the main publicly creatable object that exposes DSF client application services.

IDSFDevices—a standard OLE automation collection interface that is used to enumerate the DSFDevice objects representing a snapshot of the simulated devices currently managed by DSF.

IDSFWMIProvider—provides WMI schema in user mode based on simulator driver's object model exposed to user mode IDSFWMI—allows a simulator driver to export a WMI interface directly from kernel mode Interfaces implemented by simulator drivers:

IDSFDriver—implements driver-scope events on a simulator driver-defined object that stores driver-scope state.

IDSFDevice—provides services on a single device

IDSFSimWMI—used to expose a WMI interface directly from kernel mode

ICLassFactory—implemented on a class object exposed by the DSFDriver object to create objects exported to user mode (IDSFDriver::GetClassObject).

Interfaces defined by HRMs for hardware interception events on a simulator driver-defined object that stores device-scope state. These are typically implemented on the DSFDevice object.

Interfaces implemented HRMs:

IDSFHrm—used by DSF to inform the HRM of driver-scope events

IDSFHrmDevice—used by DSF to inform the HRM of hardware-specific events such as resource allocation, device insertion, and device removal.

DSFREGISTER

Simulator drivers or any driver that will use DSF services must first call the DSFRegister function exported from DSFKSvcs.sys.

```
NTSTATUS
    DSFRegister(
        DRIVER_OBJECT *pDriverObject,
        PUNICODE_STRING pRegistryPath,
        DSFDriverType  DriverType,
        DSFDispatchType DispatchType
        IDSFDriver  *pIDSFDriver
    );
```

PARAMETERS pDriverObject
  Pointer to DRIVER_OBJECT received by the driver's DriverEntry routine. Export drivers must pass NULL for this parameter.
pRegistryPath
  Pointer to UNICODE_STRING containing driver's registry path received by the driver's DriverEntry or DllInitialize routine.
DriverType
  An enumerated value that indicates that caller's driver type (function, filter, bus, export).
Dispatch Type
  An enumerated value that indicates whether DSF should take over all driver entry points in the DRIVER_OBJECT or only hook the entry points for use with device objects created by DSF.
piDSFDriver
  Pointer to driver's implementation of IDSFDriver interface.

RETURN VALUE

Returns STATUS_SUCCESS on success; otherwise returns one of the following error values:
STATUS_NO_MEMORY
  DSF could not allocate memory for per-driver data.
STATUS_INVALID_PARAMETER
  Any of the pointers are not valid or piDSFDriver is not an IDSFDriver interface.
Other
  Error returns from IDSFDriver or kernel API calls made by DSF.

COMMENTS

Bus, filter, and function drivers must call this function during DriverEntry. Export drivers must call it in DllInitialize. The behavior for calls made at other times is undefined.

Simulator drivers must specify DispatchType=DSFHandleAllIRPs. They should not set any entry points in DRIVER_OBJECT as DSF will fill in its own entry points and handle all interfaces with the kernel on behalf of the driver.

Export drivers must specify DispatchType=DSFHandleNoIRPs.

Other non-export drivers can specify DispatchType=DSFHandlePrivateIRPs or DSFHandleAllIRPs. Drivers that specify DSFHandlePrivateIRPs should set their own entry points in DRIVER_OBJECT before calling this function. DSF will replace the entry points in DRIVER_OBJECT with its own entry points and forward all calls for device objects that it does not own to the original entry points. If the driver is a miniport or minidriver it must call the parent driver's registration function before calling DSFRegister and specify DSFHandlePrivateIRPs.

DSF allocates its per-driver state in this function and may call one or more methods on the specified IDSFDriver interface. In particular, DSF will always call IDSFDriver::GetID followed by IDSFDriver::Initialize.

IDSFDRIVERSVCS

IDSFDriverSvcs is the main interface that exposes DSF kernel mode services. It is the first interface acquired by a driver when it receives a call to IDSFDriver::Initialize. All DSF kernel mode services are either exposed directly on this interface or are available by calling IDSFDriverSvcs::QueryInterface. Drivers should view IDSFDriverSvcs and its associated interfaces as being in driver scope i.e. these interfaces do not operate on device-specific data.

The IDSFDriverSvcs interface consists of the following methods:
  CreateHrmDevice
  CreateObject
  ExportKernelModeObject
  ExportObjects
  IsUserModeRunning
  RevokeKernelModeObject
  RevokeObjects
  ShutdownSystem In addition, all COM interfaces inherit the following IUnknown interface methods:
  AddRef
  QueryInterface
  Release The following interfaces can be acquired by calling IDSFDriverSvcs::QueryInterface:
  IDSFLog, IDSFMalloc, IDSFVersion, IerrorInfo, and IconnectionPointContainer.

The following event interfaces are supported via IConnectionPointContainer:
  IDSFDriverDispatch

IDSFDRIVERSVCS::CREATEOBJECT

A driver calls this method in order to create an object exported by another driver.

```
NTSTATUS
    IDSFDriverSvcs::CreateObject(
        CLSID &rclsidObject,
        IID   &riid,
        PVOID *ppvInterface
    );
```

PARAMETERS rclsidObject
  CLSID of object to create.

riid
    IID of interface to return on object
ppvInterface
    Interface pointer returned here. Caller must release.
RETURN VALUE
Returns STATUS_SUCCESS on success; otherwise returns one of the following error values:
STATUS_NO_MEMORY
    The driver could not allocate memory to create the object.
STATUS_INVALID_PARAMETER
    The CLSID is not associated with a registered object or the object does not support the requested interface.
STATUS_INVALID_DEVICE_STATE
    The call was made at an invalid IRQL. See below.
COMMENTS Drivers can use this method at any time to create an object exported by another driver. DSF will determine the implementing driver, load the driver if necessary, and call IDSFDriver::GetClassObject and then IClassFactory::CreateInstance for the specified CLSID. The implementing driver may choose whether to create a new object and return it or to return an interface on an existing instance of the object.

For objects registered by the implementing driver using IDSFDriverSvcs::ExportObjects, this method can be called in any thread context at IRQL PASSIVE_LEVEL. For objects registered using IDSFDriverSvcs::ExportKernelModeObject, this method can be called in any thread context at IRQL<=DISPATCH_LEVEL. If the caller is not certain how the object was registered, then it should make the call at IRQL PASSIVE_LEVEL.

IDSFDRIVERSVCS::EXPORTKERNELMODEOBJECT

The simulator driver calls this method in order to export a COM object for use by kernel mode clients.

```
NTSTATUS
    IDSFDriverSvcs::ExportKernelModeObject(
        CLSID &rclsidObject
    );
PARAMETERS
    rclsidObject
        The CLSID of the object to export.
```

RETURN VALUE
Returns STATUS_SUCCESS on success; otherwise returns one of the following error values:
STATUS_NO_MEMORY
    DSF could not allocate memory for object model data.
COMMENTS Simulator drivers can use this method at any time to export an object to kernel mode clients. User mode clients will not be able to create objects exported with this method. To expose objects to both kernel and user mode call IDSFDriverSvcs::ExportObjects. The method can be called multiple times. To revoke the object registration use IDSFDriverSvcs::RevokeObjects. Starting at some point during this call, the driver should be prepared to receive IDSFDriver::GetClassObject and IClassFactory::CreateInstance calls for the specified CLSID in any thread. Kernel mode clients can create an instance of the object by calling IDSFDriverSvcs::CreateObject. Object registration is not persistent across a reboot. This method can be called in any thread context at IRQL<=DISPATCH_LEVEL.

IDSFDRIVERSVCS::EXPORTOBJECTS

The simulator driver calls this method in order to export an object model in both user and kernel mode.

```
NTSTATUS
    IDSFDriverSvcs::ExportObjects(
        UINT idTypeLib
    );
PARAMETERS
    idTypeLib
```

The ID of a TYPELIB resource in the simulator driver's executable file that contains a type library describing the object model to expose in user mode.
RETURN VALUE
Returns STATUS_SUCCESS on success; otherwise returns one of the following error values:
STATUS_INVALID_DEVICE_STATE
    User mode is not currently running and COM registration cannot be performed. This is not an error condition. If user mode starts later the registration will be done at that time.
STATUS_NO_MEMORY
    DSF could not allocate memory for the object model data.
STATUS_INVALID_PARAMETER
    idTypeLib does not correspond to a TYPELIB resource in the driver's executable.
Other
    Errors that occurred during user mode COM object registration.
COMMENTS Simulator drivers can use this method at any time to export an object model to user mode. The method can be called multiple times to export multiple type libraries. To revoke the object registration use IDSFDriverSvcs::RevokeObjects.

Before making this call, the driver should be prepared to receive IDSFDriver::GetClassObject and IClassFactory::CreateInstance calls in any thread (possibly before the call returns) for any CLSID in the type library.

User mode clients can create objects registered by this method as for any other COM object i.e. by calling CoCreateInstance or CoGetClassObject and IClassFactory::CreateInstance. Kernel mode clients can create objects registered by this method by calling IDSFDriverSvcs::CreateObject.

Type library registration is persistent across a reboot.

The COM registration is largely the same as for standard user mode objects. All objects are registered as in-proc servers with InProcServer32=DSFUSvcs.dll. DSF user mode services implements a proxy object in user mode and marshals the interface calls to the kernel mode object implemented by the driver. An additional KernelModeServer key is added for kernel mode clients indicating the path and ID of the implementing driver.

This method can be called in any thread context at IRQL PASSIVE_LEVEL. If user mode is running, this call will result in a user mode transition that will involve disk activity and will block until it is completed. If user mode is not running, the registration will occur when user mode starts. If user mode never starts, then this method has no effect and even kernel mode clients will not be able to create any of the objects in the type library. To export a kernel mode-only object, use IDSFDriverSvcs::ExportKernelModeObject.

IDSFDRIVERSVCS::CREATEHRMDEVICE

The property returns an interface on an HRMDevice object for the specified device and resource type.

```
NTSTATUS
    IDSFDriverSvcs::CreateHrmDevice(
        ULONG           idResType,
        IDSFDevice      *piDSFDevice,
        IUnknown        **ppunkHrm,
    );
```

PARAMETERS idResType
   Returns an IUnknown interface on an HRMDevice object for the HRM for this resource type. See Hardware Resource Type IDs for a list of resource types. A type other than those listed may be used if it has been registered on the system.
piDSFDevice
   IDSFDevice interface on the DSFDevice object for which to create the HmiDevice object.
ppunkHrm
   IUnknown interface on the HRMDevice object returned here. The caller must release this interface. The caller must call IUnknown::QueryInterface for the HRM's custom interface. See the HRM specification for details.

RETURN VALUE

Returns STATUS_SUCCESS on success
STATUS_INVALID_PARAMETER
   idResType does not correspond to an existing HRM.
STATUS_NO_MEMORY
   DSF could not allocate memory for HRM administration.
Other
   As returned by the HRM from IDSFHrmDevice::Initialize.

COMMENTS

For PNP resources the HRMDevice object is available on the individual resource objects returned from IDSFDevice::get_Resources. This method is generally called only for non-PNP hardware resources such as ACPI access but it can be called for any existing HRM.

This method can be called only at IRQL PASSIVE_LEVEL.

IDSFDRIVERSVCS::ISUSERMODERUNNING

Allows a driver to determine if DSF user mode services are currently available.

```
BOOL
IDSFDriverSvcs::IsUserModeRunning( );
```

PARAMETERS
None

RETURN VALUE

Returns TRUE if user mode is running else FALSE.

COMMENTS

Drivers can call this method at any time to determine if user mode is currently running. The method returns TRUE if user mode is running and DSF user mode services have established a connection with DSF kernel mode services. It allows drivers to check whether operations such as IDSFDriverSvcs::ExportObjects and IDSFDriverSvcs::RevokeObjects will succeed.

IDSFDRIVERSVCS::INITIATEPOWERACTION

This method initiates a change in the system power state.

```
NTSTATUS
    IDSFDriverSvcs::InitiatePowerAction(
        POWER_ACTION         SystemAction,
        SYSTEM_POWER_STATE   MinSystemState,
        ULONG                Flags,
        BOOLEAN              Asynchronous
    );
```

PARAMETERS

SystemAction
   A POWER_ACTION value indicating whether to suspend, hibernate, or shutdown the system.
MinSystemState
   A SYSTEM_POWER_STATE value indicating the minimum required power state that should result from this call.
Flags
   One or more values from POWER_ACTION_POLICY.Flags.
Asynchronous
   If TRUE then action will be initiated but not completed before this function returns.

RETURN VALUE

Returns STATUS_SUCCESS on success.

COMMENTS

This method allows the driver to suspend, hibernate, or shutdown and optionally reboot the system.

It can be called in any thread context at IRQL PASSIVE_LEVEL.

IDSFDRIVERSVCS::REVOKEKERNELMODEOBJECT

The simulator driver calls this method in order to revoke the registration of an exported object established by a prior call to IDSFDriverSvcs::ExportKernelModeObject.

```
NTSTATUS
    IDSFDriverSvcs::RevokeKernelModeObject(
        CLSID &rclsidObject
    );
```

PARAMETERS rclisdObject
   The CSLID passed to IDSFDriverSvcs::ExportKernelModeObject.

RETURN VALUE

Returns STATUS_SUCCESS on success; otherwise returns one of the following error values:
STATUS_INVALID_PARAMETER
   clsidObject does not correspond to an object registered by a prior call to IDSFDriverSvcs::ExportKernelModeObject.

COMMENTS

Simulator drivers can use this method at any time to revoke an earlier object registration. If the system reboots before the object registration is revoked then there is no need to call this method. The driver should be prepared to receive IClassFactory::CreateInstance calls for specified CLSID on another thread while this call is running and potentially for a short while afterward until any pending calls in other threads have completed.

This method can be called in any thread context at any IRQL.

IDSFDRIVERSVCS::REVOKEOBJECTS

The simulator driver calls this method in order to revoke the registration of a user mode object model established by a prior call to IDSFDriverSvcs::ExportObjects.

```
NTSTATUS
    IDSFDriverSvcs::RevokeObjects(
        UINT idTypeLib
    );
```

PARAMETERS idTypeLib

The TYPELIB resource ID passed to IDSFDriverSvcs::ExportObjects.

RETURN VALUE

Returns STATUS_SUCCESS on success; otherwise returns one of the following error values:

STATUS_INVALID_DEVICE_STATE

User mode is not currently running and COM registration cannot be revoked. This is not an error condition. If user mode starts later the revocation will occur at that time.

STATUS_INVALID_PARAMETER idTypeLib does not correspond to a type library registered by a prior call to IDSFDriverSvcs::ExportObjects.

Other

Errors that occurred during user mode COM registration revocation.

COMMENTS

Simulator drivers can use this method at any time to revoke an earlier object model registration. This call can be made after a reboot as type library registration is persistent.

This method can be called in any thread context at IRQL PASSIVE_LEVEL. If user mode is running, then this call will result in a user mode transition that will involve disk activity and will block until it is completed. If user mode is not running, the revocation will occur when user mode starts. If user mode never starts, then this method has no effect. If user mode was running previously, then the revocation will take effect for kernel mode clients.

The driver should be prepared to receive IClassFactory::CreateInstance calls for objects in the specified type library on another thread while this call is running and potentially for a short while afterward until any pending calls in other threads have completed.

IDSFDEVICECAPS

The IDSFDeviceCaps interface is the main interface on an object that contains the contents of a DEVICE_CAPABILITIES structure.

The IDSFDeviceCaps interface consists of the following properties:

get/put_Version
get/put_DeviceD1
get/put_DeviceD2
get/put_LockSupported
get/put_EjectSupported
get/put_Removable
get/put_DockDevice
get/put_UniqueID
get/put_SilentInstall
get/put_RawDeviceOK
get/put_SurpriseRemovalOK
get/put_WakeFromD0
get/put_WakeFromD1
get/put_WakeFromD2
get/put_WakeFromD3
get/put_HardwareDisabled
get/put_NonDynamic
get/put_WarmEjectSupported
get/put_NoDisplayInUI
get/put_Reserved4
get/put_Address
get/put_UINumber
get/put_DeviceState
get/put_SystemWake
get/put_DeviceWake
get/put_D1Latency
get/put_D2Latency
get/put_D3Latency In addition, all COM interfaces inherit the following IUnknown interface methods:

AddRef
QueryInterface
Release

IDSFLOG

The IDSFLog interface provides DSF kernel mode logging services to the simulator driver. Simulator drivers acquire this interface by calling IDSFKvcs::QueryInterface. Client applications acquire this interface by calling IDSF::get_Log.

The IDSFLog interface consists of the following methods:

WriteLog—writes an entry to the log

In addition, all COM interfaces inherit the following IUnknown interface methods:

AddRef, QueryInterface, and Release

IDSFVERSION

The IDSFVersion interface allows simulator drivers and client applications to determine DSF version information. Simulator drivers acquire this interface by calling IDSFDriverSvcs::QueryInterface. Client applications acquire this interface by calling IDSF::get_Version.

The IDSFVersion interface consists of the following methods:

get_Major—returns the DSF major version number
get_Minor—returns the DSF minor version number
get_OSMajor—returns the minimum OS major version required for this version of DSF
get_OSMinor—returns the minimum OS minor version required for this version of DSF Simulator drivers and applications should check whether they have been compiled with a version of DSF headers that is compatible with the running version of DSF. DSF always maintains compatibility with prior minor versions but not necessarily with major versions. The documentation for a particular version explicitly states compatibility with prior versions.

In addition, all COM interfaces inherit the following IUnknown interface methods:

AddRef, QueryInterface, and Release

IDSFMALLOC

The IDSFMalloc interface provides a memory allocator service that is used for all memory shared between DSF and drivers. When DSF returns a buffer from a method that must be freed by a driver it uses IDSFMalloc. The same applies to all buffers returned from driver methods.

The IDSFMalloc interface is acquired by calling IDSFDriverSvcs::QueryInterface.-

The IDSFMalloc interface consists of the following methods:
AllocPaged
AllocNonPaged
Free In addition, all COM interfaces inherit the following IUnknown interface methods:
AddRef
QueryInterface
Release

IDSFMALLOC::ALLOCNONPAGED

Allocates memory from non-paged pool.

```
NTSTATUS
    IDSFMalloc::AllocNonPaged(
    SIZE_T NumberOfBytes,
    ULONG Tag,
    PVOID *ppBuf
    );
```

PARAMETERS
NumberOfBytes
  Number of bytes to allocate.
Tag
  Specifies the pool tag for the allocated memory. Drivers normally specify the pool tag as a string of up to four characters, delimited by single quotation marks. The string is usually specified in reversed order. The ASCII value of each character in the tag must be between 0 and 127.
ppBuf
  Pointer to allocated memory returned here. The caller must free the memory with IDSFMalloc::Free.
RETURN VALUE
Returns STATUS_SUCCESS on success
STATUS_NO_MEMORY
  DSF could not allocate memory for the buffer.
COMMENTS
  All memory allocated by the driver and passed to DSF where DSF will free it must be allocated with this method or with IDSFMalloc::AllocPaged.
  This method can be called in any thread context at IRQL<=DISPATCH_LEVEL.

IDSFMALLOC::ALLOCPAGED

Allocates memory from paged pool.

```
NTSTATUS
    IDSFMalloc::AllocPaged(
        SIZE_T      NumberOfBytes,
        ULONG       Tag,
        PVOID       *ppBuf
    );
```

PARAMETERS
NumberOfBytes
  Number of bytes to allocate.
Tag
  Specifies the pool tag for the allocated memory. Drivers normally specify the pool tag as a string of up to four characters, delimited by single quotation marks. The string is usually specified in reversed order. The ASCII value of each character in the tag must be between 0 and 127.
ppBuf
  Pointer to allocated memory returned here. The caller must free the memory with IDSFMalloc::Free.
RETURN VALUE
Returns STATUS_SUCCESS on success
STATUS_NO_MEMORY
  DSF could not allocate memory for the buffer.
COMMENTS
  All memory allocated by the driver and passed to DSF where DSF will free it must be allocated with this method or with IDSFMalloc::AllocNonPaged.
  This method can be called in any thread context at IRQL<DISPATCH_LEVEL.

IDSFMALLOC::FREE

Frees memory allocated by IDSFMalloc::AllocNonPaged or IDSFMalloc::AllocPaged.

```
VOID
    IDSFMalloc::Free(
        PVOID pBuf
        );
```

PARAMETERS
pBuf
  Pointer to buffer allocated by IDSFMalloc::AllocNonPaged or IDSFMalloc::AllocPaged.
RETURN VALUE
None
COMMENTS
  All memory allocated by IDSFMalloc::AllocNonPaged or IDSFMalloc::AllocPaged must be freed by this method.
  This method can be called in any thread context. If IRQL is DISPATCH_LEVEL. then the memory must have been allocated with IDSFMalloc::AllocNonPaged. If IRQL is <DISPATCH_LEVEL. then the memory can come from either allocation method.

IDSFHRM::INITIALIZE

This method is called by DSF to allow for HRM-scope initialization tasks.
  NTSTATUS
  IDSFHrm::Initialize( );
PARAMETERS
None
RETURN VALUE
Returns STATUS_SUCCESS on success.
Other
  As needed by the driver.
COMMENTS
  This method is called in an arbitrary thread context at IRQL PASSIVE_LEVEL.

IDSFHRM::ADDDEVICE

This method is called by DSF when a simulator driver either explicitly loads the HRM for a device or DSF loads it for use with a hardware resource assigned to the device by the PNP manager.

```
NTSTATUS
    IDSFHrm::AddDevice(
        IDSFHrmDevice **ppiDSFHrmDevice
        );
```

PARAMETERS ppiDSFHrmDevice

The HRM must return an IDSFHrmDevice interface on a newly created device-scope object here.

RETURN VALUE

Returns STATUS_SUCCESS on success.

Other

As needed by the driver.

COMMENTS

DSF calls this method when a simulator driver calls IDSFDriverSvcs::CreateHrmDevice or when DSF determines the hardware resource list for a device. If the HRM returns an error from this method it will be returned from the loading driver's IDSFDriverSvcs::CreateHrmDevice call. After this call completes the HRM will receive an IDSFHrmDevice::Initialize call.

This method can be called multiple times over the life of the IDSFHrm interface. DSF calls this method when it requires that the HRM create a new device-scope object. DSF may also recycle existing HRM device-scope objects by calling IDSFHirmDevice::Terminate followed by IDSFHrm::Initialize.

This method is called in an arbitrary thread context at IRQL PASSIVE_LEVEL.

IDSFHRM::TERMINATE

This method is called by DSF to allow the HRM to perform driver-scope cleanup.

NTSTATUS

IDSFHrm::Terminate( );

PARAMETERS

None

RETURN VALUE

Returns STATUS_SUCCESS on success.

Other

As needed by the driver.

COMMENTS

The HRM will be unloaded from memory following this call and it should assume that no further calls will be received on any of its existing interfaces other than IUnknown::Release.

This method is called in an arbitrary thread context at IRQL PASSIVE_LEVEL.

IDSFHRMDEVICE::INITIALIZE

This method is called by DSF to allow the HRM to perform per-device initialization tasks.

```
NTSTATUS
    IDSFHrmDevice::Initialize(
        IDSFDriverSvcs *piDSFDriverSvcs,
        IDSFDevice   *piDSFDevice
        IDSFResourceList *piDSFResourceListRaw,
        IDSFResourceList *piDSFResourceListXlated
        );
```

PARAMETERS piDSFDriverSvcs

IDSFDriverSvcs interface used by the driver loading the HRM. Note that this is not the same IDSFDriverSvcs interface received by the HRM when it called DSFRegister. It is used to allow the HRM to request DSF services such as logging in the scope of and on behalf of the loading driver.

piDSFDevice

IDSFDevice interface on the DSFDevice object for which the simulator driver is loading the HRM.

piDSFResourceListRaw

An interface pointer on the raw resource list for the device.

piDSFResourceListXlated

An interface pointer on the translated resource list for the device.

RETURN VALUE

Returns STATUS_SUCCESS on success.

Other

As needed by the driver.

COMMENTS

DSF calls this method when a simulator driver calls IDSFDriverSvcs::CreateHrmDevice or when DSF determines the hardware resource list for a device. If the HRM returns an error from this method it will be returned from the loading driver's IDSFDriverSvcs::CreateHrmDevice call.

The HRM cannot call IDSFDevice::get_Resources during this call as the DSFDevice itself will only receive the resource list after this call completes.

DSF may choose to reuse HrmDevice objects and consequently this method may be called multiple times over the life of the IDSFHrmDevice interface. The HRM should destroy any state related to the prior call to Initialize before processing the parameters.

This method is called in an arbitrary thread context at IRQL PASSIVE_LEVEL.

IDSFHRMDEVICE::STARTFAULTINJECTION

This method is called by DSF when a client application has requested that the HRM begin injecting faults into the hardware interface.

```
NTSTATUS
    IDSFHrmDevice::StartFaultInjection(
        VARIANT *pvarParams,
        ULONG   cParams
        VARIANT *pvarContext
        );
```

PARAMETERS pvarParams

Pointer to array of VARIANT containing parameters that determine the nature of fault injection to be performed.

cParams

Number of parameters in pvarParams.

pvarContext

Pointer to an empty VARIANT. The method can optionally return a value in the VARIANT as a context indicator. The same VARIANT must be passed to IDSFHmiDevice::StopFaultInjection.

RETURN VALUE

Returns STATUS_SUCCESS on success.

Other

As needed by the driver.

COMMENTS

DSF calls this method when a client application requests hardware fault injection for the HRM on the device. DSF does not define the number or contents of parameters. HRMs must document the parameters they support and their implementation.

This method is called in an arbitrary thread context at IRQL<=DISPATCH_LEVEL.

IDSFHRMDEVICE::STOPFAULTINJECTION

This method is called by DSF when a client application has requested that the HRM stop injecting faults requested by the prior call to IDSFHrmDevice::StartFaultInjection.

```
NTSTATUS
    IDSFHrmDevice::StopFaultInjection(
        VARIANT *pvarContext
    );
PARAMETERS
``` pvarContext
Pointer to the VARIANT returned from IDSFHrmDevice::StartFaultInjection.
RETURN VALUE
Returns STATUS_SUCCESS on success.
Other
As needed by the driver.
COMMENTS
DSF calls this method when a client application requests to stop hardware fault injection for the HRM on the device. This call always follows a prior IDSFHrmDevice::StartFaultInjection.
This method is called in an arbitrary thread context at IRQL<=DISPATCH_LEVEL.

IDSFHRMDEVICE::TERMINATE

This method is called by DSF to request that the HRM disassociate the DSFDevice object passed to the prior call to IDSFHrmDevice::Initialize.
NTSTATUS
IDSFHrmDevice::Terminate( );
PARAMETERS
None
RETURN VALUE
Returns STATUS_SUCCESS on success.
Other
As needed by the driver.
COMMENTS
The HRM can use this method to perform any device-specific cleanup. The HRM cannot assume that it will be unloaded from memory following this call as DSF may choose to cache it or it may be in use for other devices.
This method is called in an arbitrary thread context at IRQL PASSIVE_LEVEL.

IDSFDRIVER::ADDDEVICE

This method is called by DSF to allow the simulator driver to create a DSFDevice object that represents the simulated hardware.

```
NTSTATUS
    IDSFDriver::AddDevice(
        IDSFDevice **ppiDSFDevice
    );
```

PARAMETERS
ppiDSFDevice
IDSFDevice interface on a DSFDevice object returned here. DSF will release.
RETURN VALUE
Returns STATUS_SUCCESS on success
COMMENTS
DSF calls this method when the operating system has detected the addition of a new device of the type simulated by the driver (i.e. during the PNP AddDevice routine implemented on behalf of the driver by DSF). This may occur because of actual hardware detection or because of simulated hardware detection due to a request from a client application to create a new simulated device.
The DSFDevice object created by the simulator driver during this method represents the hardware device being simulated—it is not the device object seen by the operating system. The driver uses this object to store device-specific state.
If the DSFDevice object will need to monitor hardware access, the driver should sink any hardware event interfaces defined by HRMs.
Drivers are not obligated to implement a DSFDevice object. A driver that is used for some type of generic service may not need to maintain any device-scope state or respond to device-scope events. In this case the driver can simply return STATUS_SUCCESS and a NULL interface pointer.
This method is called in a system thread context at IRQL PASSIVE_LEVEL.

IDSFDRIVER::GETCLASSOBJECT

This method is called by DSF to request a class object for the specified CLSID. It is part of the mechanism by which drivers expose COM objects.

```
NTSTATUS
    IDSFDriver::GetClassObject(
        REFCLSID        rclsid
        REFIID          riid
        LPVOID          **ppv
    );
```

PARAMETERS
rclsid
ID of the class (CLSID) object requested.
riid
Interface requested on the class object. Currently this is always IClassFactory but this could change in future.
ppv
Requested interface pointer returned here. Caller will release.
RETURN VALUE
Returns STATUS_SUCCESS on success
COMMENTS
DSF calls this method when a client application has requested to create a COM object exposed by the driver. Drivers can expose COM objects using IDSFDriver::Initialize, IDSFDriverSvcs::ExportObjects, or IDSFDriverSvcs::ExportKernelModeObject.

IDSFDRIVER::GETID

This method is called by DSF to request a unique identifier for the simulator driver.
GUID
IDSFDriver::GetID( );
PARAMETERS
None
RETURN VALUE
GUID that uniquely identifies the simulator driver.

COMMENTS

DSF calls this method when it needs the driver's unique identifier. This identifier must be unique among all drivers using DSF services. It is used throughout DSF internally and in other interfaces to identify the particular driver. If a driver returns a GUID that is already in use by another driver, DSF will terminate all subsequent activity with the driver returning the non-unique identifier.

This method can be called in any thread context at any IRQL.

IDSFDRIVER::INITIALIZE

This method is called by DSF to allow the simulator driver to perform driver-scope initialization tasks.

```
NTSTATUS
    IDSFDriver::Initialize(
        IDSFDriverSvcs        *piDSFDriverSvcs,
        PUNICODE_STRING       pstrTypeLib
    );
```

PARAMETERS piDSFDriverSvcs
    IDSFDriverSvcs interface on an object that DSF uses to manage driver-scope state and export driver-scope services.

pstrTypeLib
    Pointer to string in which the driver can optionally return the name of its type library resource. The string buffer must be allocated with IDSFMalloc::AllocPaged. If the driver does not have a type library then this parameter can be ignored.

RETURN VALUE

Returns STATUS_SUCCESS on success

STATUS_REVISION_MISMATCH

The driver cannot work with the currently loaded version of DSF or with the host operating system.

COMMENTS

DSF calls this method during the simulator driver's call to DSFRegister which is called during DriverEntry or DllInitialize. The driver should call IDSFDriverSvcs::AddRef and store the pointer in its DSFDriver object. The driver should release this interface during a subsequent call to IDSFDriver::Terminate.

This call also give the driver an opportunity to check whether it can run in the current operating environment by calling IoIsWdmVersionAvailable and by checking the DSF version. The DSF version is checked by calling IDSFDriverSvcs::QueryInterface for IDSFVersion and checking whether the version the driver was compiled with is compatible with the running version of DSF. See IDSFVersion for more information.

IDSFDRIVER::TERMINATE

This method is called by DSF to allow the simulator driver to perform driver-scope cleanup.

VOID
  IDSFDriver::Terminate( );
  PARAMETERS
  None
  RETURN VALUE
  None

COMMENTS

DSF calls this method when the driver is about to be unloaded from memory. The driver should call IDSFDriverSvcs::Release prior to or during this call.

This method is called in a system thread context at IRQL PASSIVE_LEVEL.

IDSFDEVICE::GET_CAPABILITIES

IDSFDEVICE::PUT_CAPABILITIES

The Capabilities property contains an interface on an object that describes the device's PNP and power capabilities.

```
NTSTATUS
    IDSFDevice::get_Capabilities(
        IDSFDeviceCaps        **ppiDSFDeviceCaps
    );
NTSTATUS
    IDSFDevice::put_Capabilities(
        IDSFDeviceCaps        *piDSFDeviceCaps
    );
```

PARAMETERS ppiDSFDeviceCaps
    An interface pointer on the device capabilities object returned here. Caller must release.

piDSFDeviceCaps
    An interface pointer on the device capabilities object.

RETURN VALUE

Returns STATUS_SUCCESS on success

STATUS_NO_MEMORY

Could not allocate memory for device capabilities object.

COMMENTS

The object hierarchy returned from this property contains the information received from a bus driver in the IRP_MJ_PNP/IRP_MN_QUERY_CAPABILITIES in the DEVICE_CAPABILITIES structure. For direct hardware emulation devices DSF sets this property as part of its processing of this IRP.

This property can be accessed at or below IRQL DISPATCH_LEVEL.

IDSFDEVICE::GET_CHILDREN

This read-only property returns a collection of objects that represent the set of child devices created and/or managed by the device.

```
NTSTATUS
    IDSFDevice::get_Children(
        IDSFDevices *ppiDSFDevices
    );
```

PARAMETERS ppiDSFDevices
    Interface on the collection returned here. Caller must release.

RETURN VALUE

Returns STATUS_SUCCESS on success

COMMENTS

If a simulated device creates child devices, then it should store the IDSFDevice pointers of those devices in a collection and expose the collection through this property. DSF provides a publicly creatable object (DSFDevices) that implements this collection. Simulator drivers can create it using IDSFDriverSvcs::CreateObject, This property can be accessed at or below IRQL DISPATCH_LEVEL.

IDSFDEVICE::GET_COMPATIBLEIDS

IDSFDEVICE::PUT_COMPATIBLEIDS

The property contains the simulated device's PNP compatible IDs.

```
NTSTATUS
    IDSFDevice::get_CompatibleIDs(
        PUNICODE_STRING      *ppstrIDs
    );
NTSTATUS
    IDSFDevice::put_CompatibleIDs(
        PUNICODE_STRING      pstrIDs
    );
```

PARAMETERS ppstrIDs

Compatible IDs string returned here. Caller must free buffer with IDSFMalloc::Free.

pstrIDs

Specifies new compatible IDs. Caller owns string.

RETURN VALUE

Returns STATUS_SUCCESS on success

STATUS_NO_MEMORY

Object could not allocate memory for string.

COMMENTS

A list of IDs that describe the device. When specifying more than one compatible ID, specify multiple null terminating strings with a final double null containing the IDs in the order of most-specific to most-general to facilitate choosing the best driver match for the device.

Setup checks the IDs against the IDs listed in INF files for possible matches. Setup first scans the hardware IDs list, then the compatible IDs list. Earlier entries are treated as more specific descriptions of the device, and later entries as more general (and thus less optimal) matches for the device. If no match is found in the list of hardware IDs, Setup might prompt the user for installation media before moving on to the list of compatible IDs.

This is the string that DSF will return to the PNP manager for IRP_MN_QUERY_ID/BusQueryCompatibleIDs if DSF has generated its PDO.

This property can be accessed at or below IRQL DISPATCH_LEVEL.

IDSFDEVICE::GET_DEVICEID

IDSFDEVICE::PUT_DEVICEID

The property contains the simulated device's PNP device ID.

```
NTSTATUS
    IDSFDevice::get_DeviceID(
        PUNICODE_STRING      *ppstrID
    );
NTSTATUS
    IDSFDevice::put_DeviceID(
        PUNICODE_STRING      pstrID
    );
```

PARAMETERS ppstrID

Device ID string returned here. Caller must free buffer with IDSFMalloc::Free.

pstrID

Specifies new device ID. Caller owns string.

RETURN VALUE

Returns STATUS_SUCCESS on success

STATUS_NO_MEMORY

Object could not allocate memory for string.

COMMENTS

The most-specific description of the device possible, incorporating the name of the enumerator and strings identifying the manufacturer, device, revision, packager, and packaged product, where possible. For example, the PCI bus driver responds with device IDs of the form PCI\VEN_xxxx&DEV_xxxx&SUBSYS_xxxxxxxx&REV_xx, encoding all five of the items mentioned above. However, a device ID should not contain enough information to differentiate between two identical devices. This information should be encoded in the instance ID.

This is the string that DSF will return to the PNP manager for IRP_MN_QUERY_ID/BusQueryDeviceID.

DSF will set this property for devices for which it generates the PDO.

This property can be accessed at or below IRQL DISPATCH_LEVEL.

IDSFDEVICE::GET_ENABLED

IDSFDEVICE::PUT_ENABLED

This property indicates whether the simulated device's hardware interface is enabled.

```
NTSTATUS
    IDSFDevice::get_Enabled(
        BOOL *pfEnabled
    );
NTSTATUS
    IDSFDevice::put_Enabled(
        BOOL fEnabled
    )
```

PARAMETERS pfEnabled

State of the Enabled property returned here.

fEnabled

New state of the Enabled property.

RETURN VALUE

Returns STATUS_SUCCESS on success for

COMMENTS

Client applications use this property to enable and disable the simulated device's hardware interface. The exact implementation and meaning of disabling the device is determined by the simulator. Note that this state may or may not correspond to the device's PNP state depending on the simulator's implementation. When this property is set or changed internally by the object in response to any other stimulus the object should fire the corresponding event in the IDSFDeviceEvents interface (IDSFDeviceEvents::Enabled and IDSFDeviceEvents::Disabled).

This property can be accessed at or below IRQL DISPATCH_LEVEL.

IDSFDEVICE::GET_HARDWAREIDS AND

IDSFDEVICE::PUT_HARDWAREIDS

The property contains the device's PNP hardware IDs.

```
NTSTATUS
    IDSFDevice::get_HardwareIDs(
        PUNICODE_STRING      *ppstrIDs
    );
NTSTATUS
    IDSFDevice::put_HardwareIDs(
        PUNICODE_STRING      pstrIDs
    );
```

PARAMETERS ppstrIDs

Hardware IDs string returned here. Caller must free buffer with IDSFMalloc::Free.

pstrIDs

Specifies new hardware IDs. Caller owns string.

RETURN VALUE

Returns STATUS_SUCCESS on success

STATUS_NO_MEMORY

Object could not allocate memory for string.

COMMENTS

A list of IDs that describe the device. When specifying more than one hardware ID, specify multiple null terminating strings with a final double null containing the IDs in the order of most-specific to most-general to facilitate choosing the best driver match for the device. The first entry in the hardware IDs list is the most-specific description of the device and, as such, it is usually identical to the device ID.

This is the string that DSF will return to the PNP manager for IRP_MN_QUERY_ID/BusQueryHardwareIDs if DSF has generated its PDO.

This property can be accessed or below IRQL DISPATCH_LEVEL.

IDSFDEVICE::INITIALIZE

This method is called by DSF for direct hardware emulation devices to allow the DSFDevice object to perform any initialization tasks and to inform it of the default operating mode.

```
NTSTATUS
    IDSFDevice::Initialize(
        DSFOpMode *pOpMode
    );
```

PARAMETERS pOpMode

On input, points to the default operating mode assigned to this device.

The driver can change the value as desired. For more information see Controlling Operating Mode.

RETURN VALUE

Returns STATUS_SUCCESS on success

Other

As needed by simulator driver.

COMMENTS

DSF calls this method immediately after requesting that the simulator driver create a DSFDevice object (see IDSFDriver::AddDevice). For child emulation devices the implementation should document the requirements for calling this method.

This method is called in an arbitrary system thread context at IRQL PASSIVE_LEVEL.

IDSFDEVICE::GET_INSERTED

IDSFDEVICE::PUT_INSERTED

This property indicates whether the simulated device's hardware appears present in the system.

```
NTSTATUS
    IDSFDevice::get_Inserted(
        BOOL *pfInserted
    );
NTSTATUS
    IDSFDevice::put_Inserted(
        BOOL fInserted
    )
```

PARAMETERS pfInserted

State of the Inserted property returned here.

fInserted

New state of the Inserted property.

RETURN VALUE

Returns STATUS_SUCCESS on success for

COMMENTS

Client applications manipulate this property in order to hot plug and remove the simulated device. The exact implementation is determined by the simulator but typically involves changing the state of its hardware interface so that the device appears or disappears in the host system. Note that this state may or may not correspond to the device's PNP state depending on the simulator's implementation. When this property is set by an application or changed internally by the object in response to any other stimulus the object should fire the corresponding event in the IDSFDeviceEvents interface (IDSFDeviceEvents::Inserted and IDSFDeviceEvents::Removed).

This property can be accessed at or below IRQL DISPATCH_LEVEL.

IDSFDEVICE::GET_INSTANCEID

IDSFDEVICE::PUT_INSTANCEID

The property contains the simulated device's PNP instance ID.

```
NTSTATUS
    IDSFDevice::get_InstanceID(
        PUNICODE_STRING *ppstrID
    );
NTSTATUS
    IDSFDevice::put_InstanceID(
        PUNICODE_STRING pstrID
    );
```

PARAMETERS ppstrID

Device ID string returned here. Caller must free buffer with IDSFMalloc::Free.

pstrID

Specifies new device ID. Caller owns string.

RETURN VALUE

Returns STATUS_SUCCESS on success

STATUS_NO_MEMORY

Object could not allocate memory for string.

COMMENTS

Setup and bus drivers use the instance ID, with other information, to differentiate between two identical devices on the machine. The instance ID is either unique across the whole machine or just unique on the device's parent bus.

If an instance ID is only unique on the bus, call IDSFDeviceCaps::put_UniqueID(False). This indicates to the PnP Manager that it should enhance the instance ID by adding information about the device's parent and thus make the ID unique on the machine.

If the caller can supply a globally unique ID for each child device on the bus, such as a serial number, call IDSFDeviceCaps::put_UniqueID(False).

This is the string that DSF will return to the PNP manager for IRP_MN_QUERY_ID/BusQueryInstanceID.

DSF will set this property for devices for which it generates the PDO.

This property can be accessed at or below IRQL DISPATCH_LEVEL.

IDSFDEVICE::GET_HRM

The property returns an interface on an HRMDevice object for the specified resource type.

```
NTSTATUS
    IDSFDevice::get_Hrm(
    ULONG              idResType,
    IUnknown           **ppunkHrm,
    );
```

PARAMETERS idResType
  Returns an IUnknown interface on an HRMDevice object for the HRM for this resource type. See Hardware Resource Type IDs for a list of resource types. A type other than those listed may be used if it has been registered on the system.

ppunkHrm
  IUnknown interface on the HRMDevice object returned here. The caller must release this interface. The caller must call IUnknown::QueryInterface for the HRM's custom interface. See the HRM specification for details.

RETURN VALUE

Returns STATUS_SUCCESS on success
STATUS_INVALID_PARAMETER
  idResType does not correspond to an existing HRM.
STATUS_NO_MEMORY
  DSF could not allocate memory for HRM administration.
Other
  As returned by the HRM from IDSFHrmDevice::Initialize.

COMMENTS

A simulated direct hardware emulation device is responsible for maintaining a list of the HRMDevice objects it uses and exposing them through this property. Child emulation devices do not need to implement this property.

For PNP resources the HRM object is available on the individual resource objects returned from IDSFDevice::get_Resources. This property is generally called only for non-PNP hardware resources such as ACPI access but it can be called for any existing HRM.

In kernel mode this property can be accessed at IRQL PASSIVE_LEVEL.

If called in user mode, this property will return an IUnknown interface but there is no guarantee that the HRM exports its custom interfaces to user mode. If the user mode application calls IUnknown::QueryInterface for an interface that is unavailable in user mode then that call will return E_NOINTERFACE. See the HRM specification for details regarding user mode availability.

IDSFDEVICE::GET_NAME

IDSFDEVICE::PUT_NAME

The property contains the device's name.

```
NTSTATUS
    IDSFDevice::get_Name(
        PUNICODE_STRING *ppstrName
    );
NTSTATUS
    IDSFDevice::put_Name(
        PUNICODE_STRING pstrName
    );
```

PARAMETERS ppstrName
  Name returned here. Caller must free buffer with IDSFMalloc::Free.
pstrName
  Specifies new name. Caller owns string.

RETURN VALUE

Returns STATUS_SUCCESS on success
STATUS_NO_MEMORY
Object could not allocate memory for name.

COMMENTS

This property serves as a display name for the device and is not used to uniquely identify it. Devices should allow applications to freely set this property to an arbitrary string. DSF does not use this property.

This property can be accessed at or below IRQL DISPATCH_LEVEL.

IDSFDEVICE::GET_OBJECT

This read-only property exposes simulator-defined objects associated with the device.

```
NTSTATUS
    IDSFDevice::get_Object(
        CLSID    &rclsidObject,
        IUnknown **ppunkObject,
    );
```

PARAMETERS rclsidObject
  CLSID of the object requested.
ppunkObject
  IUnknown interface on the requested object returned here. Caller must release.

RETURN VALUE

Returns STATUS_SUCCESS on success
Other
  As needed by simulator driver (e.g. out of memory condition trying to allocate the object).

COMMENTS

The property allows the simulator to expose objects specific to an instance of a device. For example, a USB EHCI controller simulator might expose a EHCIController object that has methods to add simulated devices to the USB bus. There are no limitations on the type of objects exposed or whether new or existing instances are returned.

Simulator drivers must call IDSFDriverSvcs::ExportObjects for any object returned from this property to user mode. If the driver has not called IDSFDriverSvcs:: ExportObjects prior to this call, then it can do so during the call. If the property returns a non-NULL value and IDSFDriverSvcs::ExportObjects has not been called, then DSF will immediately release the returned interface and the user mode caller will receive an error.

This property can be accessed at IRQL PASSIVE_LEVEL.

IDSFDEVICE::GET_OPMODE

IDSFDEVICE::PUT_OPMODE

This property indicates whether the simulated device's hardware interface is enabled.

```
NTSTATUS IDSFDevice::get_OpMode(
    DSFOpMode *pOpMode
)
NTSTATUS IDSFDevice::put_OpMode(
    DSFOpMode OpMode
)
```

PARAMETERS
pOpMode
  Returns the current operating mode of the device.
OpMode
  The requested operating mode for the device.
RETURN VALUE
Returns STATUS_SUCCESS on success.
STATUS_INVALID_PARAMETER
Can't make requested change to the operating mode.
COMMENTS
Client applications use this property to determine the device's operating mode. The simulator is not required to accept any requested change to its operating mode and should document the changes it supports.

When this property is set or changed internally by the object in response to any other stimulus the object should fire the corresponding event in the IDSFDeviceEvents interface (IDSFDeviceEvents::OpModeChange).

For more information see Controlling Operating Mode.
This property can be accessed at or below IRQL DISPATCH_LEVEL.

IDSFDEV ICE::GET_PARENT

IDSFDEVICE::PUT_PARENT

The Parent property holds an interface on a DSFDevice object that represents the simulated device that enumerated this device.

```
NTSTATUS
    IDSFDevice::get_Parent(
        IDSFDevice *ppiDSFDevice
    );
NTSTATUS
    IDSFDevice::put_Parent(
        IDSFDevice *piDSFDevice
    );
```

PARAMETERS
ppiDSFDevice
  IDSFDevice interface on the parent device returned here. Caller must release.
piDSFDevice
  New value for Parent property.
RETURN VALUE
Returns STATUS_SUCCESS on success
COMMENTS
If a simulated device creates a child device, it should set the child's Parent property with its own IDSFDevice. This connection allows a client application to navigate the simulated device hierarchy.

This property can be accessed at or below IRQL DISPATCH_LEVEL.

IDSFDEVICE::GET_PERSISTENT

IDSFDEVICE::PUT_PERSISTENT

This property indicates whether the simulated device should be persisted across the next boot.

```
NTSTATUS
    IDSFDevice::get_Persistent(
        BOOL *pfPersistent
    );
NTSTATUS
    IDSFDevice::put_Persistent(
        BOOL fPersistent
    )
```

PARAMETERS
pfPersistent
  State of the Persistent property returned here.
fpersistent
  New state of the Persistent property.
RETURN VALUE
Returns STATUS_SUCCESS on success for
COMMENTS
Client applications use this property to determine whether the simulated device will be created again at the next boot. This property does not apply to simulated devices that are created due to the presence of hardware (i.e. PDO not generated by DSF). DSF gets the value of this property if the device exists at system shutdown. This property can be accessed at or below IRQL DISPATCH_LEVEL.

IDSFDEVICE::GET_RESOURCES

IDSFDEVICE::PUT_RESOURCES

The Resources property contains a collection of the hardware resources used by the device.

```
NTSTATUS
    IDSFDevice::get_Resources(
        IDSFResourceList **ppiDSFResourceListRaw,
        IDSFResourceList **ppiDSFResourceListXlated
    );
NTSTATUS
    IDSFDevice::put_Resources(
        IDSFResourceList *piDSFResourceListRaw,
        IDSFResourceList *piDSFResourceListXlated
    );
```

PARAMETERS ppiDSFResourceListRaw

An interface pointer on the raw resource list used to program the device is returned here. Caller must release.

ppiDSFResourceListXlated

An interface pointer on the translated resource list used to connect interrupt vectors, map I/O space, and map memory is returned here. Caller must release.

piDSFResourceListRaw

An interface pointer on the raw resource list.

piDSFResourceListXlated

An interface pointer on the translated resource list.

RETURN VALUE

Returns STATUS_SUCCESS on success

STATUS_INVALID_DEVICE_STATE

Resource list is not available yet.

STATUS_NO_MEMORY

DSF could not allocate memory for resource list objects.

COMMENTS

The object hierarchy returned from this property contains the information received from the PNP manager in IRP_MJ_PNP/IRP_MN_START_DEVICE in the CM_RESOURCE_LIST structure. The individual resource objects also have a property that references the HRM for the particular resource type.

For direct hardware emulation devices DSF sets this property as part of its IRP_MN_START_DEVICE processing. If the simulator driver needs to monitor any hardware access it should set up any needed interfaces with HRMs when this property is first set and should be prepared for hardware access events immediately after this call returns.

This property can be accessed at or below IRQL DISPATCH_LEVEL.

IDSFDEVICE::GET_STATE

This read-only property returns the value of the simulated device's state bits.

```
NTSTATUS
    IDSFDevice::get_State(
        PLONG *plState
    );
```

PARAMETERS plState

State bits returned here.

RETURN VALUE

Returns current value of device state bits.

COMMENTS

The usage of state bits is defined by the simulated device. DSF does not use this property. It is defined as a convenience mechanism for controlling basic simulated device state without the need to export an object model. The client application can set bits in the State property by calling IDSFDevice::SetStateBit.

This property can be accessed in any thread context at any IRQL.

IDSFDEVICE::SETSTATEBIT

This method changes the value of one bit in the device's State property.

```
NTSTATUS
    IDSFDevice::SetStateBit(
        LONG  lBit,
        DSFBitOp BitOp
    );
```

PARAMETERS lBit

Zero-based index of the bit to be changed where 0 is the least significant bit.

BitOp

A value from the DSFBitOp enumeration indicating the operation to perform on the specified bit (turn on, turn off, or toggle).

RETURN VALUE

Returns STATUS_SUCCESS on success; otherwise returns one of the following error values:

STATUS_INVALID_PARAMETER

BitOp does not contain a valid value from the DSFBitOp enumeration.

COMMENTS

The usage of state bits is defined by the simulated device. DSF does not use this property. It is defined as a convenience mechanism for controlling basic simulated device state without the need to export an object model. The client application can retrieve the State property by calling IDSFDevice::get_State.

This method can be called in any thread context at any IRQL.

IDSFDEVICE::STARTFAULTINJECTION

This method instructs the device to request that the HRM for the specified resource type begin injecting faults into the hardware interface for the device.

```
NTSTATUS
    IDSFDevice::StartFaultInjection(
        LONG    idResType,
        VARIANT *pvarParams,
        LONG    cParams
        VARIANT *pvarContext
    );
```

PARAMETERS idResType

Specifies the resource type for which to start fault injection. See Hardware Resource Type IDs for a list of resource types. A type other than those listed may be used if it has been registered on the system. If DSFResourceTypeNull is specified, then the fault injection is defined by the simulator and does not involve an HRM.

pvarParams

Pointer to array of VARIANT containing parameters that determine the nature of fault injection to be performed.

cParams

Number of parameters in pvarParams.

pvarContext

Pointer to an empty VARIANT. The method can optionally return a value in the VARIANT as a context indicator. The same VARIANT must be passed to IDSFDevice::StopFaultInjection.
RETURN VALUE
Returns STATUS_SUCCESS on success.
Other
As returned by the simulator driver or the HRM.
COMMENTS
DSF does not define the number of or contents of parameters. See the HRM documentation for the parameters they support and their implementation.
The device should call IDSFDeviceEvents::StartFaultInjection in response to this method call. If that method returns success, and idResType is not DSFResourceTypeNull, then it should call IDSFHrmDevice::StartFaultInjection on the corresponding HRM.
This method can be called in an arbitrary thread context at IRQL<=DISPATCH_LEVEL.

IDSFDEVICE::STOPFAULTINJECTION
This method instructs the device to request that the HRM for the specified resource type stop injecting faults requested by a prior call to IDSFDevice::StartFaultInjection.

```
NTSTATUS
    IDSFDevice::StopFaultInjection(
        LONG    idResType
        VARIANT *pvarContext
    );
```

PARAMETERS
idResType
Specifies the resource type for which to stop fault injection. See Hardware Resource Type IDs for a list of resource types. A type other than those listed may be used if it has been registered on the system. If DSFResourceTypeNull is specified, then the fault injection is private to the simulator driver and does not involve an HRM.
pvarContext
Pointer to the VARIANT returned from IDSFDevice::StartFaultInjection.
RETURN VALUE
Returns STATUS_SUCCESS on success.
STATUS_INVALID_DEVICE_STATE
The call was made at an invalid IRQL or it did not follow a prior call to IDSFDevice::StartFaultInjection.
Other
As returned by the simulator driver or the HRM.
COMMENTS
This call must always follow a prior IDSFDevice::StartFaultInjection.
The device should call IDSFDeviceEvents::StopFaultInjection in response to this method call. If that method returns success, and idResType is not DSFResourceTypeNull, then it should cals[SP?] IDSFHrmDevice::StopFaultInjection on the corresponding HRM.
This method can be called in an arbitrary thread context at IRQL<=DISPATCH_LEVEL.

IDSFDEVICE::TERMINATE
This method is called by DSF for direct hardware emulation devices prior to its final release of all interface pointers on the DSFDevice object to allow for any cleanup tasks.
void
IDSFDevice::Terminate( );

PARAMETERS
None
RETURN VALUE
None
COMMENTS
Direct hardware emulation devices should tear down any event interfaces on HRMs at this time.
For child emulation devices the implementation should document the requirements for calling this method.
This method is called in an arbitrary system thread context at IRQL PASSIVE_LEVEL.

IDSFDEVICEEVENTS::DISABLED
This event is fired by the simulated device when its Enabled property is reset.
VOID
IDSFDeviceEvents::Disabled( );
PARAMETERS
None
RETURN VALUE
None
COMMENTS
The simulated device fires this event when its hardware interface has been disabled. The exact implementation and meaning of disabling the device is determined by the simulator and is dependent on the definition of its hardware interface.
This event is fired in an arbitrary system thread context at any IRQL<=DISPATCH_LEVEL.

IDSFDEVICEEVENTS::ENABLED
This event is fired by the simulated device when its Enabled property is set.
VOID
IDSFDeviceEvents::Enabled( );
PARAMETERS
None
RETURN VALUE
None
COMMENTS
The simulated device fires this event when its hardware interface has been enabled. The exact implementation and meaning of disabling the device is determined by the simulator and is dependent on the definition of its hardware interface.
This event is fired in an arbitrary system thread context at IRQL<=DISPATCH_LEVEL.

IDSFDEVICEEVENTS::INSERTED
This event is fired by the device when its Inserted property is set.
VOID
IDSFDeviceEvents::Inserted( );
PARAMETERS
None
RETURN VALUE
None
COMMENTS
The simulated device fires this event when a client application simulates hot plugging the device. The exact implementation and meaning of inserting the device is a hardware operation and is determined by the simulator.
This event is fired in an arbitrary system thread context at IRQL<=DISPATCH_LEVEL.

IDSFDEVICEEVENTS::OPMODECHANGE
The device fires this event when its operating mode is initially set and whenever it changes.

VOID
IDSFDeviceEvents::OpModeChange( );
PARAMETERS
None
RETURN VALUE
None
COMMENTS
For more information see Controlling Operating Mode.
This event is fired in an arbitrary system thread context at IRQL<=DISPATCH_LEVEL.

IDSFDEVICEEVENTS::REMOVED
This event is fired by the device when its Inserted property is reset.
VOID
IDSFDeviceEvents::Removed( );
PARAMETERS
None
RETURN VALUE
None
COMMENTS
The simulated device fires this event when a client application simulates removing the device from the system. The exact implementation and meaning of removing the device is a hardware operation and is determined by the simulator.
This event is fired in an arbitrary system thread context at IRQL<=DISPATCH_LEVEL.

IDSFDEVICEEVENTS::RESOURCESSET
This event should be fired when the simulated device's Resources property is set.
VOID
IDSFDeviceEvents::ResourcesSet( );
PARAMETERS
None
RETURN VALUE
None
COMMENTS
This event informs the sink that the device's resource set has been established and that the Resources property can be retrieved to examine them during this event and thereafter.
This event is fired in an arbitrary system thread context at IRQL<=DISPATCH_LEVEL.

IDSFDEVICEEVENTS::STOPFAULTINJECTION
This event informs the sink that fault injection begun following a prior IDSFDeviceEvents::StartFaultInjection call has been terminated for the HRM corresponding to the specified resource type.

```
NTSTATUS
    IDSFDeviceEvents::StopFaultInjection(
        ULONG idResType
    );
PARAMETERS
``` idResType
Specifies the resource type for which to stop fault injection. See Hardware Resource Type IDs for a list of resource types. A type other than those listed may be used if it has been registered on the system. If DSFResourceTypeNull is specified, then the fault injection is private to the simulator driver and does not involve an HRM.

RETURN VALUE
Returns STATUS_SUCCESS on success.
Other
As returned by the driver.
COMMENTS
This event should always follow a prior IDSFDeviceEvents::StartFaultInjection call. If idResType is DSFResourceTypeNull then the request is for the simulator driver to stop its own private fault injection behavior.
Devices fire this event as part of their implementation of IDSFDevice::StopFaultInjection. If this event returns success and idResType is not DSFResourceTypeNull, then the device calls IDSFHrmDevice::StopFaultInjection on the corresponding HRM. HRMs that implement IDSFDeviceEvents should not stop fault injection upon receiving this event. They should wait to receive IDSFHrmDevice::StopFaultInjection.
This event is fired in an arbitrary thread context at IRQL<=DISPATCH_LEVEL.

IDSFDEVICEEVENTS::STATECHANGE
This event is fired by the simulated device when it receives a call to IDSFDevice::SetStateBit or when it initiates a state bit change.

```
VOID
    IDSFDeviceEvents::StateChange(
        UINT uBit,
        UINT uValue
        );
```

PARAMETERS
uBit
The zero-based index of the bit that that changed. Index zero is the least significant bit.
uValue
The new value for the bit-zero or one.
RETURN VALUE
None
COMMENTS
See IDSFDevice::SetStateBit and IDSFDevice::GetState for more information.
This event can be fired in any thread context at any IRQL.

IDSF::CREATEDEVICE
This method creates a new direct hardware simulation device and returns the DSFDevice object that represents it.

```
HRESULT/NTSTATUS CreateDevice (
    BSTR              bstrDeviceID,
    BSTR              bstrInstanceID,
    SAFEARRAY         aHardwareIDs,
    SAFEARRAY         aCompatibleIDs,
    IDSFResourceList  *piDSFResourceListRaw,
    IDSFResourceList  *piDSFResourceListXlated,
    IDSFDeviceCaps    *piDSFDeviceCaps,
    IDSFDevice        **ppiDSFDevice
)
```

PARAMETERS
bstrDeviceID
The most-specific description of the device possible, incorporating the name of the enumerator and strings identifying the manufacturer, device, revision, packager, and packaged product, where possible. For example, the PCI bus driver responds with device IDs of the form PCI\VEN_xxxx&DEV_xxxx&SUBSYS_xxxxxxxx&REV_xx encoding all five of the items mentioned above. However, a device ID should not contain enough information to differentiate between two identical devices. This information should be encoded in the instance ID.

This is the string that DSF will return to the PNP manager for IRP_MN_QUERY_ID/BusQueryDeviceID.

bstrInstanceID
A string that contains the instance ID for the device. Setup and bus drivers use the instance ID, with other information, to differentiate between two identical devices on the machine. The instance ID is either unique across the whole machine or just unique on the device's parent bus.

This is the string that DSF will return to the PNP manager for IRP_MN_QUERY_ID/BusQueryInstanceID.

If an instance ID is only unique on the bus, call IDSFDeviceCaps::put_UniqueID(False). This indicates to the PnP Manager that it should enhance the instance ID by adding information about the device's parent and thus make the ID unique on the machine.

If the caller can supply a globally unique ID for each child device on the bus, such as a serial number, call IDSFDeviceCaps::put_UniqueID(False).

aHardwareIDs
A list of IDs that describe the device. When specifying more than one hardware ID and/or more than one compatible ID, pass the IDs in the order of most-specific to most-general to facilitate choosing the best driver match for the device. The first entry in the hardware IDs list is the most-specific description of the device and, as such, it is usually identical to the device ID.

This is the string that DSF will return to the PNP manager for IRP_MN_QUERY_ID/BusQueryHardwareIDs.

aCompatibleIDs
Setup checks the IDs against the IDs listed in INF files for possible matches. Setup first scans the hardware IDs list, then the compatible IDs list. Earlier entries are treated as more specific descriptions of the device, and later entries as more general (and thus less optimal) matches for the device. If no match is found in the list of hardware IDs, Setup might prompt the user for installation media before moving on to the list of compatible IDs.

This is the string that DSF will return to the PNP manager for IRP_MN_QUERY_ID/BusQueryCompatibleIDs.

piDSFResourceListRaw
An interface pointer on the raw resource list used to program the device.

piDSFResourceListXlated
An interface pointer on the translated resource list used to connect interrupt vectors, map I/O space, and map memory.

piDSFDeviceCaps
An interface pointer on an object that describes the device's PNP and
power capabilities.

ppiDSFDevice
IDSFDevice interface on the new object returned here. Caller must release.

RETURN VALUE
User mode:
Returns S_OK on success.
E_OUTOFMEMORY
DSF could not allocate memory for the object.
E_INVALIDARG
ppiDSFDevice is not a valid pointer.
Kernel mode:
Returns STATUS_SUCCESS on success
STATUS_NO_MEMORY
DSF could not allocate memory for the collection.
STATUS_INVALID_PARAMETER
ppiDSFDevice is not a valid pointer.
COMMENTS
This method is used to create a new direct hardware simulation device (e.g. a simulated IDE controller). It instructs DSF to generate a PDO for the object which will cause the simulator driver to load. The simulator driver will create a DSFDevice object for the new device and an IDSFDevice interface on that object is returned from this method. For more information see Driver Load and Unload Sequences.

The returned DSFDevice object will be a member of the collection returned from IDSF::get_Devices.

In kernel mode this method can be called at IRQL PASSIVE_LEVEL.

IDSF::GET_DEVICES
This read-only property returns a collection of DSFDevice objects that represent the set of simulated devices managed by DSF at the current time.

```
HRESULT/NTSTATUS get_Devices(
    IDSFDevices **ppiDSFDevices
)
```

PARAMETERS
ppiDSFDevices
IDSFDevices interface on the collection returned here. Caller must release.
RETURN VALUE
User mode:
Returns S_OK on success.
E_OUTOFMEMORY
DSF could not allocate memory for the collection.
E_INVALIDARG
ppiDSFDevices is not a valid pointer.
Kernel mode:
Returns STATUS_SUCCESS on success
STATUS_NO_MEMORY
DSF could not allocate memory for the collection.
STATUS_INVALID_PARAMETER
ppiDSFDevices is not a valid pointer.
COMMENTS
The returned collection is a snapshot of the current set of simulated devices. It is not dynamically updated as the set of devices or their states change. The application can explicitly refresh the contents of the collection by calling IDSFDevices.Refresh.

In kernel mode property can be accessed at IRQL<=DISPATCH_LEVEL.

IDSF::GET_LOG
This read-only property returns an interface that provides access to DSF logging services.

```
HRESULT/NTSTATUS get_Log(
    IDSFLog **ppiDSFLog
)
```

PARAMETERS
ppiDSFLog
    IDSFLog interface returned here. Caller must release.
RETURN VALUE
User mode:
Returns S_OK on success.
E_OUTOFMEMORY
DSF could not allocate memory for the log object.
E_INVALIDARG
ppiDSFLog is not a valid pointer.
Kernel mode:
Returns STATUS_SUCCESS on success
STATUS_NO_MEMORY
DSF could not allocate memory for the log object.
STATUS_INVALID_PARAMETER
ppiDSFLog is not a valid pointer.
COMMENTS The returned interface can be used to access logging services in a manner similar to simulator drivers. The difference between the IDSFLog interface returned here and that returned to a simulator driver when it calls IDSFDriverSvcs::QueryInterface is that the simulator driver's interface is on a log object that contains driver-specific information that is used for all of its log entries.

In kernel mode property can be accessed at any IRQL in any thread context.

IDSF::GET_VERSION

This read-only property returns an interface that provides information on the version of DSF.

```
HRESULT/NTSTATUS get_Version(
    IDSFVersion **ppiDSFVersion
)
```

PARAMETERS
ppiDSFVersion
    IDSFVersion interface returned here. Caller must release.
RETURN VALUE
User mode:
Returns S_OK on success.
E_OUTOFMEMORY
DSF could not allocate memory for the version object.
E_INVALIDARG
ppiDSFVersion is not a valid pointer.
Kernel mode:
Returns STATUS_SUCCESS on success
STATUS_NO_MEMORY
DSF could not allocate memory for the version object.
STATUS_INVALID_PARAMETER
ppiDSFVersion is not a valid pointer.
COMMENTS:

The returned interface can be used to determine DSF version information. There is no difference between the IDSFVersion interface returned here and that returned to a simulator driver when it calls IDSFDriverSvcs::QueryInterface. In kernel mode property can be accessed at any IRQL in any thread context.

COMMENTS: When COM (or an application directly) calls IClassFactory::CreateInstance, DSFUSvcs.dll calls DSFKSvcs.sys to request object creation. DSFKSvcs queries the simulator driver's main interface (IDSFDriver:: GetClassObject) for a class object and calls IClassFactory::CreateInstance. The simulator driver creates the requested object and returns a pointer to the specified interface (no different than user mode COM). DSFKSvcs stores the object pointer, and returns a handle to DSFUSvcs that represents it. DSFUSvcs creates a proxy object that represents the simulator driver object in user mode and responds to the user mode request with an IDispatch interface on the proxy object.

References on the proxy object are not relayed to the kernel mode object. DSFUSvcs keeps the handle to the kernel mode object until the user mode client releases its last reference. The simulator driver will only see a single reference on its object for each interface it returns to the framework.

Calls to IUnknown::QueryInterface in user mode are forwarded to DSFKSvcs and handled in a similar fashion to IClassFactory::CreateInstance. DSFKSvcs calls IUnknown:: QueryInterface on the kernel mode object, stores the additional interface pointer, and returns a new handle representing it to user mode. Note that for interfaces other than IUnknown and IDispatch, DSFUSvcs always returns an IDispatch interface to the client application. Future versions of DSF will implement vtable binding and return dual interfaces. As few client application platforms (e.g. VBScript) are prepared to use multiple IDispatch interfaces on a single object, it is recommended that simulator driver objects expose only a single interface. Method and property access calls that return objects are handled as described above for IUnknown::QueryInterface. In short, every object interface returned from the simulator driver is stored by DSFKSvcs and a handle for it is returned to user mode.

DSFUSvcs.dll uses the definitions from the type library to determine the properties, methods, and events to expose for an IDispatch interface it implements on behalf of a simulator driver. When the DSFUSvcs IDispatch implementation receives a method call or property access, it forwards the request and its parameters to DSFKSvcs.sys along with the handle that represents the simulator driver object's interface. DSFKSvcs builds a stack frame and calls the interface method in the simulator driver's object.

A simulator driver can specify that multiple simultaneous calls to a particular method or property access function be serialized by using a custom attribute in its type library. If a serialized method is currently running, then DSFKSvcs will mark the additional call(s) pending in the order that they are received. When the current call completes, the oldest waiting call continues. Note that this mechanism is implemented entirely by DSFKSvcs and special code is not generally required in the simulator driver.

The embodiments of the invention in which an exclusive property or privilege is claimed are defined as follows:

1. A method for testing a computer component by the use of a framework that facilitates communication between a test application operating in a user address space of an operating system and the computer component operating in a kernel address space of the operating system, wherein the method comprises:
    creating a component object in the kernel address space, wherein the component object comprises at least one interface for communicating data with the computer component;

creating a proxy object in the user address space, wherein the proxy object is configured to represent the component object, wherein the proxy object represents the component object by relating an operating system identifier to the proxy object and to the component object;

establishing a communication channel between the proxy object in the user address space and the component object in the kernel address space;

communicating a plurality of data parameters from the test application to the proxy object, wherein the data parameters represent a method call;

combining the plurality of data parameters into a formatted data packet, wherein the formatted data packet is configured for transmission through the communication channel;

communicating the formatted data packet from the proxy object in the user address space to the component object in the kernel address space, wherein communicating the formatted data packet is facilitated by the communication channel;

decombining the formatted data packet, thereby retrieving the plurality of data parameters from the formatted data packet for processing by the component object;

communicating the plurality of data parameters from the component object to the computer component for processing of the plurality of data parameters by the computer component;

arranging the plurality of parameters such that the component object perceives the method call as occurring locally;

in the kernel address space, combining a plurality of component data parameters into a second formatted data packet, wherein the component data parameters represent a component method call, wherein the second formatted data packet is configured for transmission through the communication channel;

communicating the second formatted data packet containing the plurality of component data parameters from the component object in the kernel address space to the proxy object in the user address space, wherein communicating the second formatted data packet is facilitated by the communication channel;

decombining the second formatted data packet, thereby retrieving the plurality of component data parameters from the second formatted data packet for processing by the proxy object; and arranging the plurality of parameters such that the proxy object perceives the component method call as occurring locally.

2. The method of claim 1, wherein the communication channel is formed in accordance with Windows Management Instrumentation.

3. The method of claim 1, wherein the communication channel is formed in accordance with an IOCTL programming interface.

4. The method of claim 1, wherein the communication channel is formed in accordance with an application programming interface for reading and writing file data streams.

5. The method of claim 1, wherein the computer component is a device driver.

6. The method of claim 1, wherein the computer component is a simulator driver.

7. The method of claim 1, wherein the plurality of data parameters provides a software object having data and methods providing access to the data.

8. The method of claim 2, wherein the plurality of component data parameters provides a software object having data and methods providing access to the data.

9. The method of claim 1, wherein the test application comprises a plurality of commands formed to invoke functions of the computer component.

10. A computer-readable medium containing computer-readable instructions which, when executed by a computer, performs the method of claim 1.

11. A method for communicating data between a kernel object in the kernel address space of an operating system and a proxy object in the user address space of the operating system, wherein the method comprises:

creating the kernel object in the kernel address space, wherein the kernel object comprises at least one interface for communicating data with a computer component;

creating the proxy object in the user address space, wherein the proxy object is configured to represent the kernel object, wherein the proxy object represents the kernel object by relating an operating system identifier to the proxy object and to the kernel object;

establishing a communication channel between the proxy object in the user address space and the kernel object in the kernel address space;

combining a plurality of data parameters into a formatted data packet, wherein the data parameters represent a method call, and wherein the formatted data packet is configured for transmission through the communication channel;

communicating the formatted data packet from the proxy object in the user address space to the kernel object in the kernel address space, wherein communicating the formatted data packet is facilitated by the established communication channel;

decombining the formatted data packet, thereby retrieving the plurality of data parameters from the formatted data packet for processing in the kernel object;

arranging the plurality of parameters such that the kernel object perceives the method call as occurring locally;

at the kernel object, combining a plurality of data parameters into a second formatted data packet, wherein the data parameters represent a second method call, wherein the second formatted data packet is configured for transmission through the communication channel;

communicating the second formatted data packet from the kernel object in the kernel address space to the proxy object in the user address space, wherein communicating the second formatted data packet is facilitated by the communication channel;

decombining the second formatted data packet, thereby retrieving the plurality of data parameters from the second formatted data packet for processing by the proxy object; and arranging the plurality of data parameters such that the proxy object perceives the second method call as occurring locally.

12. The method of claim 11, wherein the communication channel is formed in accordance with Windows Management Instrumentation.

13. The method of claim 11, wherein the communication channel is formed in accordance with an IOCTL programming interface.

14. The method of claim 11, wherein the communication channel is formed in accordance with an application programming interface for reading and writing file data streams.

15. A computer-readable medium containing computer-readable instructions which, when executed by a computer, performs the method of claim 11.

16. A system for providing data communication between a kernel object in the kernel address space of an operating system and a proxy object in the user space of the operating system wherein the system comprises:
 a processor;
 a memory;
 a driver for invoking instructions to create the kernel object in the kernel address space; wherein the kernel object corresponds to a system component to be tested;
 a kernel mode framework having at least one interface for communicating data with the kernel object; and
 a user mode framework for invoking instructions to create the proxy object in the user address space, wherein the proxy object is configured to represent the kernel object, wherein the proxy object represents the kernel object by relating an operating system identifier to the proxy object and to the kernel object;
 wherein:
  the user mode framework and the kernel mode framework are configured for establishing a communication channel between the proxy object and the kernel object, wherein the communication channel is formed in accordance with Windows Management Instrumentation;
  the user mode framework is configured to invoke instructions to combine a first set of data parameters for creating a first data packet, wherein the user mode framework is configured to communicate the first data packet to the kernel mode framework over the communication channel, wherein the kernel mode framework is configured to invoke instructions to decombine the first data packet to obtain the first set of data parameters, and wherein the kernel mode framework is configured to communicate the first set of data parameters to the kernel object; and wherein
  the kernel mode framework is configured to invoke instructions to combine a second set of data parameters for creating a second data packet, wherein the kernel mode framework is configured to communicate the second data packet to the user mode framework over the communication channel, and wherein the user mode framework is configured to invoke instructions to decombine the second data packet received from the kernel mode framework to obtain the second set of data parameters, and wherein the user mode framework is configured to communicate the second set of data parameters to the proxy object.

17. The system of claim 16, wherein the communication channel is formed in accordance with an IOCTL programming interface.

18. The system of claim 16, wherein the communication channel is formed in accordance with an application programming interface for reading and writing file data streams.

19. A method for facilitating the simulation of a hardware device, wherein a device simulator driver is configured to simulate a plurality of functions of the hardware device, wherein the method comprises:
 loading at least one software module, wherein the software module is configured to intercept data generated by a device driver;
 intercepting data generated by the device driver for storage of the intercepted data, wherein the software module is configured to control the communication of the intercepted data between the device driver and the hardware device;
 storing the intercepted data in a memory device and logging time stamp data with the stored data;
 directing the intercepted data to the device simulator driver from the software module, wherein the device simulator driver is configured to simulate the functions of the hardware device responsive to the receipt of data generated by the device driver;
 on the device simulator driver, simulating at least one function of the hardware device responsive to the receipt of the intercepted data; and storing the results of simulating the at least one function of the hardware device in the memory as test results of the hardware device.

20. The method of claim 19, wherein the device driver receives data from a test application causing the device driver to generate the data directed to the hardware device.

21. The method of claim 19, wherein the software module is configured to intercept data generated by the hardware device, and wherein the software module is configured to redirect data generated by the hardware device to the device simulator driver.

22. The method of claim 19, further comprising, communicating the intercepted data to the hardware device, thereby allowing the hardware device to perform at least one function responsive to the receipt of the data.

23. The method of claim 19, wherein the software module prevents communication of the intercepted data to the hardware device.

24. A computer-readable medium containing computer-readable instructions which, when executed by a computer, performs the method of claim 19.

25. A computer-controlled system for performing the method claim 19.

* * * * *